United States Patent
Abe et al.

(10) Patent No.: US 7,934,068 B2
(45) Date of Patent: Apr. 26, 2011

(54) STORAGE SYSTEM AND METHOD OF TAKING OVER LOGICAL UNIT IN STORAGE SYSTEM

(75) Inventors: Tetsuya Abe, Hiratsuka (JP); Tetsuya Shirogane, Odawara (JP)

(73) Assignee: Hitachi, Ltd., Tokyo (JP)

(*) Notice: Subject to any disclaimer, the term of this patent is extended or adjusted under 35 U.S.C. 154(b) by 499 days.

(21) Appl. No.: 12/128,274

(22) Filed: May 28, 2008

(65) Prior Publication Data
US 2009/0240898 A1 Sep. 24, 2009

(30) Foreign Application Priority Data

Mar. 21, 2008 (JP) ................................ 2008-073996

(51) Int. Cl.
*G06F 12/00* (2006.01)
*G06F 13/00* (2006.01)
*G06F 13/28* (2006.01)

(52) U.S. Cl. ......... 711/165; 711/112; 711/161; 711/173
(58) Field of Classification Search .................. 711/112, 711/161, 165, 173
See application file for complete search history.

(56) References Cited

U.S. PATENT DOCUMENTS

| | | | |
|---|---|---|---|
| 2003/0056058 A1* | 3/2003 | Veitch ............................ | 711/112 |
| 2004/0049553 A1 | 3/2004 | Iwamura et al. | |
| 2005/0283569 A1 | 12/2005 | Mizuno et al. | |
| 2006/0206675 A1* | 9/2006 | Sato et al. ....................... | 711/161 |
| 2006/0248273 A1* | 11/2006 | Jernigan et al. ................ | 711/114 |
| 2006/0248302 A1 | 11/2006 | Yamamoto et al. | |
| 2007/0245110 A1* | 10/2007 | Shibayama et al. ........... | 711/165 |
| 2008/0005288 A1 | 1/2008 | Kodama et al. | |
| 2008/0005612 A1 | 1/2008 | Arai | |

FOREIGN PATENT DOCUMENTS

| | | |
|---|---|---|
| DE | 10 2005 013502 | 9/2006 |
| EP | 1 170 657 | 1/2002 |
| EP | 1 396 789 | 3/2004 |
| EP | 1 873 644 | 1/2008 |
| JP | 2004-102374 | 4/2004 |
| JP | 2004-220450 | 8/2004 |
| JP | 2008-9707 | 1/2008 |
| JP | 2008-9767 | 1/2008 |

* cited by examiner

*Primary Examiner* — Kevin L Ellis
*Assistant Examiner* — Ryan Bertram
(74) *Attorney, Agent, or Firm* — Antonelli, Terry, Stout & Kraus, LLP.

(57) ABSTRACT

A storage apparatus includes a drive unit in which a logical unit is formed, and a controller unit for accessing the logical unit by controlling the drive unit according to an access request sent from a host apparatus. The storage apparatus issues a logical unit takeover request to the other storage apparatuses, allocates a logical unit of another storage apparatus that will accept the transfer of the logical volume to its own logical unit according to a takeover approval sent from other storage apparatuses in response to the takeover request, and thereafter migrates data of the own logical unit to a logical unit of another storage apparatus. Subsequently, the path is switched so that the access request from the host apparatus is given to one of the other storage apparatuses.

11 Claims, 32 Drawing Sheets

FIG. 6

LOGICAL UNIT MANAGEMENT TABLE 600

| HOST LU NUMBER | START ADDRESS | CAPACITY | APPARATUS LU NUMBER | START ADDRESS | MASTER APPARATUS ID | SLAVE APPARATUS ID | STATUS |
|---|---|---|---|---|---|---|---|
| HLU-1 | 0x00000000 | 0x1000 | ILU-1 | 0x00000000 | - | - | Normal |
| HLU-2 | 0x00001000 | 0x1000 | ILU-2 | 0x00001000 | - | - | Normal |
| HLU-3 | 0x00002000 | 0x1000 | ILU-3 | 0x00002000 | - | - | Normal |
| HLU-4 | 0x004f0000 | 0x0500 | SELU-10 | 0x004f0000 | Array_A | - | Normal |
| HLU-5 | 0x004f0500 | 0x1000 | SELU-11 | 0x004f0500 | Array_A | - | Normal |
| HLU-6 | 0x01000000 | 0x0500 | MELU-50 | 0x01000000 | - | Array_C | Normal |
| HLU-6 | 0x01000500 | 0x0500 | MELU-51 | 0x01000500 | - | Array_D | Normal |

PRIORITY LIST TABLE 800

| PRIORITY 801 | APPARATUS ID 802 | OPERATIONAL STATUS 803 | UNUSED CAPACITY 804 | ACCEPTANCE HISTORY 805 | |
|---|---|---|---|---|---|
| | | | | TAKEOVER ACCEPTED COUNT 805a | TAKEOVER REQUESTED COUNT 805b |
| 1 | Array7 | Active | 10000 | 12 | 20 |
| 2 | Array10 | Active | 8000 | 13 | 8 |
| 3 | Array2 | Active | 8000 | 5 | 7 |
| 4 | Array11 | Active | 8000 | 5 | 2 |
| 5 | Array6 | Active | 5000 | 10 | 2 |
| 6 | Array1 | Active | 3000 | 0 | 0 |
| 7 | Array8 | Active | 3000 | 0 | 1 |
| 8 | Array9 | Inactive | 6000 | 0 | 0 |
| 9 | Array3 | Inactive | 6000 | 16 | 18 |
| 10 | Array4 | Inactive | 5000 | 15 | 17 |

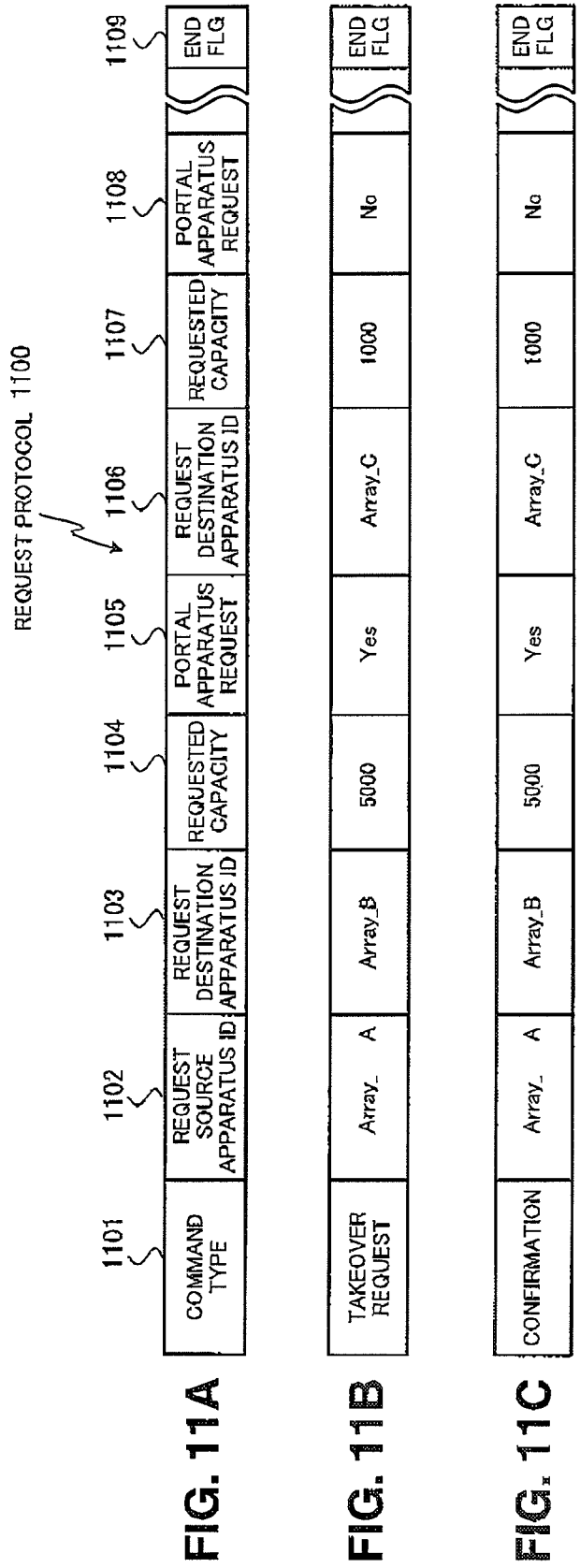

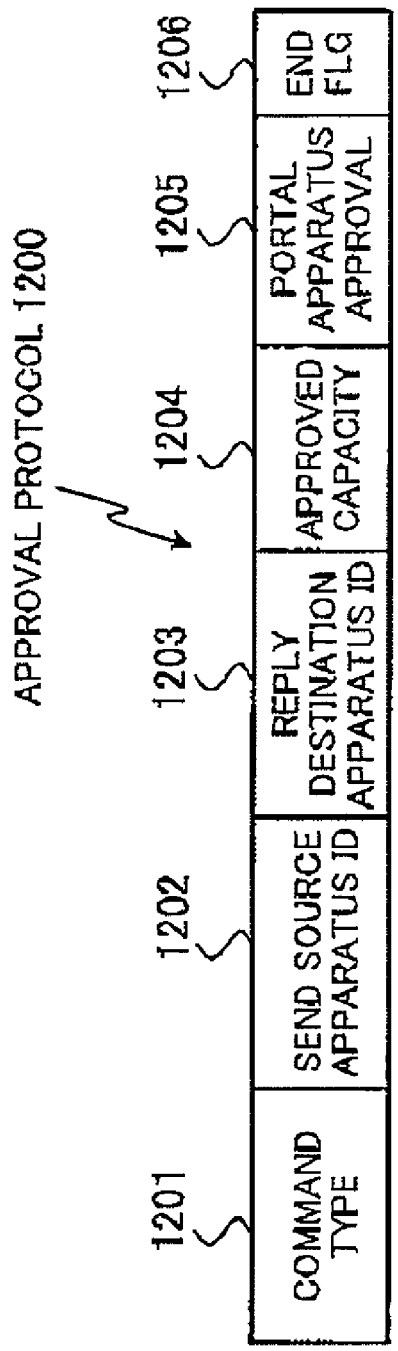
FIG. 12A
FIG. 12B

FIG. 26

STORAGE APPARATUS 5B — 600B

| HOST LU NUMBER | START ADDRESS | CAPACITY | APPARATUS LU NUMBER | START ADDRESS | MASTER APPARATUS ID | SLAVE APPARATUS ID | STATUS |
|---|---|---|---|---|---|---|---|
| HLU-1 | 0x00000000 | 0x500 | ELU-1 | 0x00000000 | - | Array_D | Normal |
| HLU-1 | 0x00000500 | 0x500 | ELU-2 | 0x00000500 | - | Array_D | Normal |

STORAGE APPARATUS 5C — 600C

| HOST LU NUMBER | START ADDRESS | CAPACITY | APPARATUS LU NUMBER | START ADDRESS | MASTER APPARATUS ID | SLAVE APPARATUS ID | STATUS |
|---|---|---|---|---|---|---|---|
| - | - | - | - | - | - | - | - |

STORAGE APPARATUS 5D — 600D

| HOST LU NUMBER | START ADDRESS | CAPACITY | APPARATUS LU NUMBER | START ADDRESS | MASTER APPARATUS ID | SLAVE APPARATUS ID | STATUS |
|---|---|---|---|---|---|---|---|
| HLU-1 | 0x00000000 | 0x500 | ELU-1 | 0x00000000 | Array_B | - | Normal |
| HLU-1 | 0x00000500 | 0x500 | ELU-1 | 0x00000500 | Array_B | - | Normal |

STORAGE APPARATUS 5B — 600B

| HOST LU NUMBER | START ADDRESS | CAPACITY | APPARATUS LU NUMBER | START ADDRESS | MASTER APPARATUS ID | SLAVE APPARATUS ID | STATUS |
|---|---|---|---|---|---|---|---|
| — | — | — | — | — | — | — | — |

STORAGE APPARATUS 5C — 600C

| HOST LU NUMBER | START ADDRESS | CAPACITY | APPARATUS LU NUMBER | START ADDRESS | MASTER APPARATUS ID | SLAVE APPARATUS ID | STATUS |
|---|---|---|---|---|---|---|---|
| — | — | — | — | — | — | — | — |

STORAGE APPARATUS 5D — 600D

| HOST LU NUMBER | START ADDRESS | CAPACITY | APPARATUS LU NUMBER | START ADDRESS | MASTER APPARATUS ID | SLAVE APPARATUS ID | STATUS |
|---|---|---|---|---|---|---|---|
| HLU-1 | 0x00000000 | 0x500 | SLU-1 | 0x00000000 | Array_B | — | Normal |
| HLU-1 | 0x00000500 | 0x500 | SLU-1 | 0x00000500 | Array_B | — | Normal |

REPLACEMENT TIMING CONFIRMATION TABLE 2800

| APPARATUS ID | NUMBER OF APPARATUS WARRANTY YEARS | OPERATION START DATE | TOTAL NUMBER OF OPERATION DAYS | REMAINING LIFETIME DAYS |
|---|---|---|---|---|
| Array_7 | 5 YEARS | 2003/01/14 | 4 YEARS AND 9 MONTHS | 30 |

2801　2802　2803　2804　2805

STORAGE SYSTEM AND METHOD OF TAKING OVER LOGICAL UNIT IN STORAGE SYSTEM

CROSS-REFERENCES

This application relates to and claims priority from Japanese Patent Application No. 2008-073996, filed on Mar. 21, 2008, the entire disclosure of which is incorporated herein by reference.

BACKGROUND

The present invention generally relates to a storage system and a takeover method of a logical unit in a storage system, and particularly relates to data migration technology where a plurality of storage apparatuses configuring a storage system dynamically take over a logical unit by operating in a cooperative distributed manner.

Pursuant to the increase in the data throughput of computer systems, the capacity of storage apparatuses storing data is also increasing. In addition, the growth in the amount of data in recent years is increasing drastically and, therefore, storage apparatuses must be enhanced or extended by necessity.

Japanese Patent Laid-Open Publication No. 2004-220450 (Patent Document 1) discloses technology for newly introducing a second storage apparatus to a computer system already comprising a first storage apparatus. Specifically, Patent Document 1 discloses technology of allocating a logical device of the newly introduced second storage apparatus to a logical device of the existing first storage apparatus so that a host computer recognizes the logical device of the existing first storage apparatus as the logical device of the newly introduced second storage apparatus. Patent Document 1 discloses technology for gradually migrating data in the first storage apparatus to the second storage apparatus.

Moreover, Japanese Patent Laid-Open Publication No. 2004-102374 (Patent Document 2) discloses data migration technology for migrating data in a storage area of a first storage subsystem to a second storage subsystem. Specifically, Patent Document 2 discloses technology of migrating, in accordance with the migration of data, the setting of a migration source storage subsystem to a migration destination storage subsystem and switching the access path of a computer to the migration destination storage subsystem using a remote management interface retained in both the migration source and migration destination storage subsystems.

Further, Japanese Patent Laid-Open Publication No. 2008-9707 (Patent Document 3) discloses data replication technology capable of mutually linking configuration information in two storage apparatuses. Specifically, Patent Document 3 discloses a storage system comprising a first storage apparatus for storing data from a host system, and a second storage apparatus for storing backup data of that data. In Patent Document 3, the first storage apparatus changes its configuration information based on a change request of confirmation information from the host system and sends the change request to the second storage apparatus, and the second storage apparatus changes its configuration information based on the change request.

Lastly, Japanese Patent Laid-Open Publication No. 2008-9767 discloses technology for dynamically securing a spare storage area from a storage area of an existing disk in order to ensure the fault tolerance of a storage apparatus.

SUMMARY

In connection with the increase in capacity of storage apparatuses, and maintenance management of storage apparatuses is becoming even more important. For example, the replacement and addition of storage apparatuses are processes essential for dealing with the drastic growth in the amount of data and the operating life of apparatuses, and typically entail the process of data migration. Generally speaking, since a storage system is used in mission critical computer systems, a professional system administrator performs system management by making full use of sophisticated skills.

Meanwhile, pursuant to the diversified needs toward computer systems in recent years, there are storage systems configured from a relatively small, all-in-one storage apparatus group. With such a storage system, the replacement of internal components, such as disk drives, controllers, and power source units, is unnecessary. Thus, since system management can be performed relatively easily, it is anticipated that demands for this kind of storage system will continue to grow in the future.

Nevertheless, even with a storage system configured using such a relatively small storage apparatus group, sufficient consideration was not given to the replacement and addition of apparatuses involving the change of the system configuration. For example, upon replacing an apparatus, unless a new storage apparatus as the migration destination of data is prepared in advance, it is not possible to remove the storage apparatus to be replaced. In addition, even during the process of data migration, the system administrator needs to make various complicated settings in the migration source and migration destination storage apparatuses, and is consequently overburdened. In particular, with a storage system having relatively small storage apparatuses, it is desirable that a user without sophisticated skills is also able to perform system management.

Thus, an object of the present invention is to propose a storage system and its control method for facilitating maintenance management such as the replacement of a storage apparatus.

In order to achieve the foregoing object, the present invention is characterized in that a plurality of storage apparatuses configuring the storage system autonomously operate in a cooperative distributed manner to take over a logical unit retained in the other storage apparatus.

Specifically, one aspect of the present invention provides a storage apparatus comprising a drive unit in which at least one logical unit is formed, and a controller unit for accessing the at least one logical unit by controlling the drive unit according to an access request sent from a host apparatus. The controller unit comprises a takeover request unit for issuing a takeover request of the at least one logical unit to a plurality of other storage apparatuses, an external storage configuration unit for allocating to the at least one logical unit a logical unit formed in each of the plurality of other storage apparatuses that will accept the takeover of the at least one logical unit according to a takeover approval sent each from the plurality of other storage apparatuses in response to the takeover request sent from the takeover request unit, a data migration unit for migrating data in the at least one logical unit to a logical unit formed in each of the plurality of other storage apparatuses allocated with the external storage configuration unit, and a path switch request unit for issuing a path switch request so that an access request from the host apparatus is given to at least one of the plurality of other storage apparatuses after the migration of the data with the data migration unit is complete.

The implementation unit of these functions in the controller unit is typically configured from software, but it may also be configured from firmware.

Another aspect of the present invention provides a storage system comprising a plurality of storage apparatuses interconnected with each other via a network. Each of the plurality of storage apparatuses comprises a drive unit in which at least one logical unit is formed, and a controller unit for accessing the at least one logical unit by controlling the drive unit according to an access request sent from a host apparatus. The controller unit in each of the plurality of storage apparatuses comprises a takeover request unit for sending a takeover request of a logical unit under the control of the control unit to the network, a takeover approval unit for determining whether to approve the takeover of a logical unit in response to a takeover request of the logical unit received from the network, a logical unit creation unit for creating a particular logical unit if the takeover approval unit determines to approve the takeover, an external storage configuration unit for allocating a particular logical unit formed in one of other storage apparatuses to the logical unit under the control of the control unit, a data migration unit for migrating data in the logical unit under the control of the control unit to the particular logical unit allocated by the external storage configuration unit, and a path switch request unit for issuing a path switch request so that an access request sent from the host apparatus is given to one of the other storage apparatuses after the migration of the data by the data migration unit is complete.

Another aspect of the present invention provides a method of taking over a logical unit in a storage system including a plurality of storage apparatuses mutually connected via a network. This takeover method comprises a step of sending, by a first storage apparatus that receives an access request from a host apparatus, a takeover request of a first logical unit to other storage apparatuses, a step of determining, by the other storage apparatuses that receives the takeover request, whether to approve the takeover of the first logical unit, a step of creating, by a second storage apparatus among the other storage apparatuses that determines to approve the takeover of the logical unit, a second logical unit for taking over the first logical unit, a step of allocating, by the first storage apparatus, the first logical unit to the second logical unit, a step of sending, by the first storage apparatus, the data to the second storage apparatus in order to migrate data in the first logical unit to the second logical unit, a step of receiving, by the second storage apparatus, the data sent from the first storage apparatus and writing the data in the second logical unit, and a step of issuing, by the first storage apparatus, a path switch request such that an access request sent from the host apparatus is given to the second storage apparatus after the sending of the data is complete.

According to the present invention, even in a case of replacing a storage apparatus in the storage system, the system administrator is not required to give particular consideration to the configuration of the logical unit formed in each storage apparatus. In addition, since the respective storage apparatuses operate in a cooperative distributed manner and dynamically take over the logical unit, the maintenance management of the storage system is facilitated thereby.

In particular, since each of the storage apparatuses in the storage system accommodate the other with the unused storage areas, the system configuration can be changed flexibly and, therefore, it is possible to effectively deal with the drastic increase in the amount of data.

The other technical characteristics and advantages of the present invention will be apparent from the following embodiments explained with reference to the attached drawings.

DESCRIPTION OF DRAWINGS

FIG. 6 is a diagram showing an example of a logical unit management table in the storage apparatus according to an embodiment of the present invention;

FIG. 8 is a diagram showing an example of a priority list table in the storage apparatus according to an embodiment of the present invention;

FIG. 11A to FIG. 11C are diagrams showing an example of a format of a takeover/confirmation command to be issued by the storage apparatus according to an embodiment of the present invention;

FIG. 12A and FIG. 12B are diagrams showing an example of a format of an approval command to be issued by the storage apparatus according to an embodiment of the present invention;

FIG. 26 is a diagram showing an example of the logical unit management table in the storage apparatus according to an embodiment of the present invention;

FIG. 27 is a diagram showing an example of the logical unit management table in the storage apparatus according to an embodiment of the present invention;

FIG. 28 is a diagram showing an example of the replacement timing confirmation table in the storage apparatus according to an embodiment of the present invention;

DETAILED DESCRIPTION

Embodiments of the present invention are now explained with reference to the attached drawings.

Figure 1:
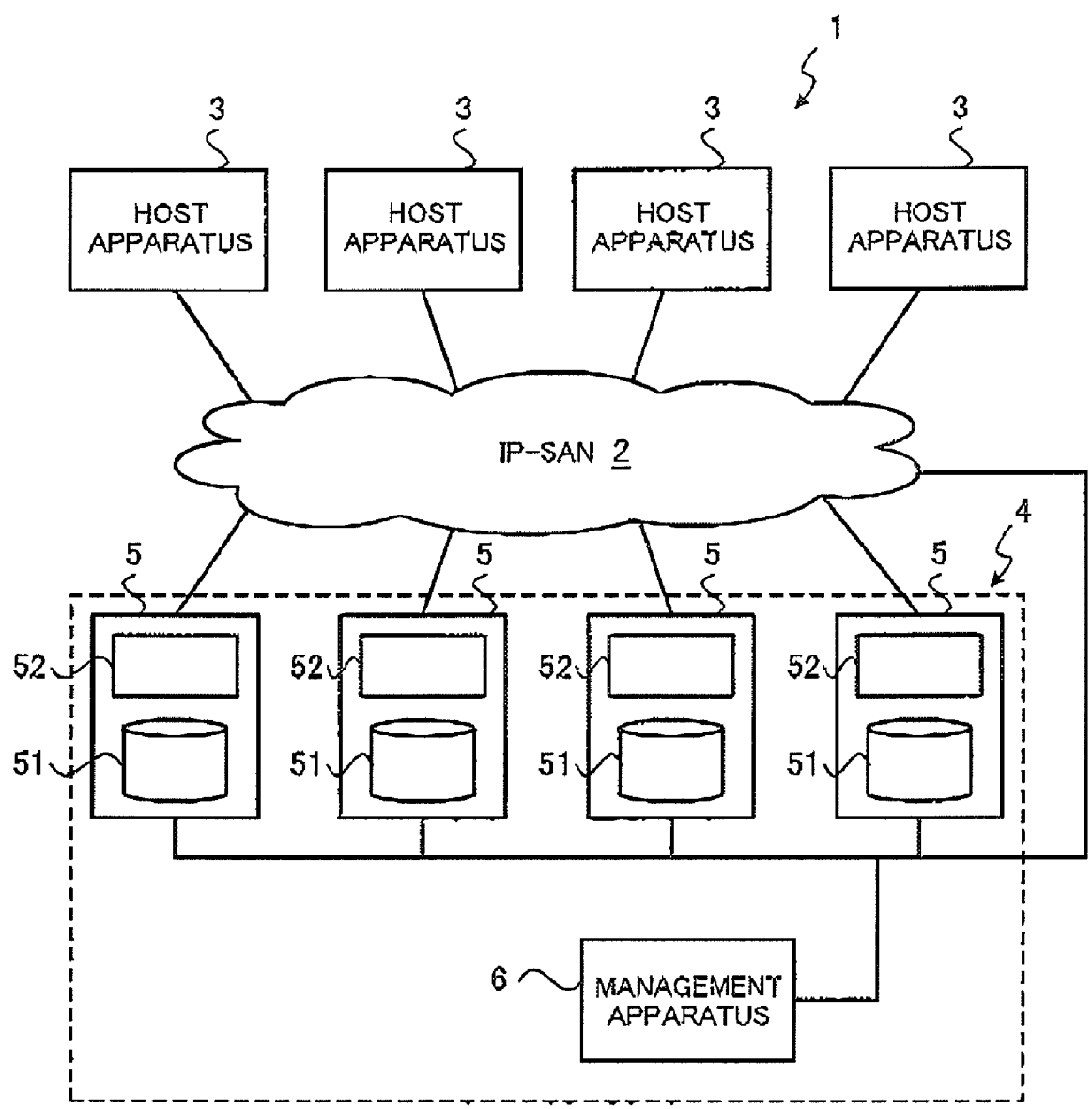
FIG. 1 is a diagram showing a schematic configuration of a computer system comprising a storage system according to an embodiment of the present invention.

FIG. 1 is a diagram showing a schematic configuration of a computer system comprising a storage system according to an embodiment of the present invention.

Referring to FIG. 1, a computer system 1 comprises a storage system 4 including a plurality of storage apparatuses 5 operatively connected to a plurality of host apparatuses 3 via a network 2. The computer system 1 also comprises a management apparatus 6 for managing the plurality of storage apparatuses 5 via a management network. In FIG. 1, the management apparatus 6 is configured as a part of the storage system 4.

The network 2 is a SAN for enabling storage access, and is typically configured by including a switch or a hub (not shown). The network 2 may use a fibre channel protocol or an IP protocol. In this embodiment, the network 2 is an IP protocol-based SAN (IP-SAN), and SCSI (i.e., iSCSI) is used in its upper layer protocol.

The host apparatus 3 is a computer for executing the intended processing, and is typically a server computer for executing the processing from a client computer (not shown). The host apparatus 3 typically comprises hardware resources, such as a processor, a main memory, a communication interface, and a local I/O device, and software resources, such as a device driver, an operating system (OS), and an application program (not shown). The host apparatus 3 thereby executes various programs under the control of the processor and, in cooperation with the hardware resources, realizes processing according to the request from the client computer. For example, the host apparatus 3 I/O-accesses the storage apparatus 5 by executing a business application program under the control of the processor, thereby realizing the intended business system.

The storage system 4 is a system for providing a data storage service for the host apparatus 3, and comprises a plurality of storage apparatuses 5. Each storage apparatus 5 comprises a plurality of drive units 51, which is physical devices, and a controller unit 52 for controlling the I/O access to the drive units 51 in response to the I/O request from the host apparatus 3. The storage apparatus 5 also typically comprises a power source unit and a cooling unit (not shown). Each storage apparatus 5 may independently provide the data storage service to the host apparatus 3; however, a single storage apparatus virtually configured from a plurality of storage apparatuses may also provide the data storage service to the host apparatus. External storage configuration technology is known as technology for virtually configuring the single storage apparatus described above.

The drive unit 51 is a physical device (PDEV) configured by including storage mediums, such as a plurality of hard disk drives (HDD) or solid state drives (SSD). The drive unit 51 may be referred to as an array unit. One or more logical devices (LDEV) to be provided to the host computer 3 are formed in the drive unit 51 under the control of the controller unit 52. The logical devices may also be formed in a virtual device (VDEV) configured by virtually congregating several hard disk drives into a single device under RAID control.

The logical device is a logical storage apparatus that is recognized by the host apparatus 3, and a logical unit (LU) is allocated thereto in this embodiment. Specifically, each port 5231 of a host interface 523 in the controller unit 52 as will be described later is allocated to each logical device, and the host apparatus 3 can thereby recognize the logical device formed in the physical device as a logical unit.

A logical unit number (LUN) is assigned to each logical unit. In addition, a logical unit is partitioned into blocks, the minimal unit for I/O access, and a logical block address (LBA) is allocated to each block. The host apparatus 3 can access a specific block in a specific logical unit by issuing a command, which includes a logical address composed of the logical unit number and the logical block address, to the storage apparatus 4.

As described above, in this embodiment that uses iSCSI, the host apparatus 3 and the storage apparatus 5 respectively serves as the initiator and the target as the iSCSI node, to which an iSCSI name is allocated. Thus, the host apparatus 3 and the storage apparatus 5 send and receive the iSCSI PDU via a network portal identified from the combination of IP address and TCP port number. The host apparatus 3 thereby recognizes the storage apparatus 5 on the network 2 and accesses the blocks in that logical unit by designating the iSCSI name, the IP address, and the TCP port number.

In order to simplify the explanation in this embodiment, it may be assumed that, during normal operation, the one or more logical units retained in the respective storage apparatuses 5 are accessed by the corresponding host apparatus 3. Thus, in this embodiment, under prescribed conditions (when a prescribed event occurs), a logical unit of a certain storage apparatus 5 in the storage system 4 is taken over by another storage apparatus 5, and the host apparatus 3 consequently access the logical unit which the other storage apparatus has taken over. Specifically, the respective storage apparatuses 5 in the storage system 4 operate in a cooperative distributed manner so that the logical units of one storage apparatus 5 are taken over by the other storage apparatuses 5 in order to continue providing the data storage service.

Figure 2:
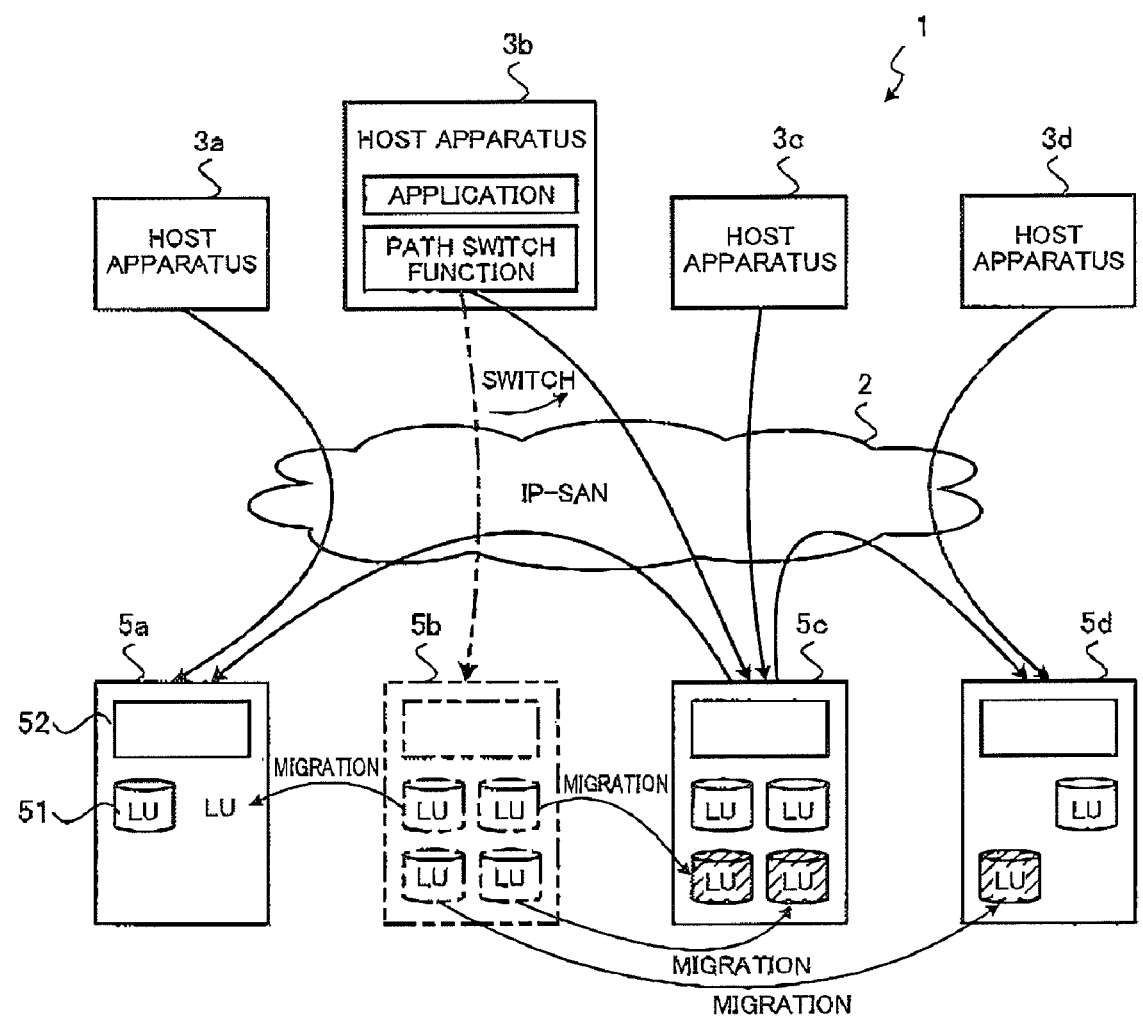
FIG. 2 is a diagram conceptually explaining the cooperative distributed operation of storage apparatuses in the storage system according to an embodiment of the present invention.

FIG. 2 is a diagram conceptually explaining the cooperative distributed operation of the storage apparatuses 5 in the storage system 4 according to an embodiment of the present invention. Specifically, FIG. 2 shows the takeover of logical units in a case of removing one storage apparatus 5 from the storage system 4.

Specifically, as shown in FIG. 2, the plurality of host apparatuses 3 are operatively connected to the plurality of storage apparatuses 5 forming the storage system 4 via the network 2. This example shows four host apparatuses 3a-3d and the corresponding storage apparatuses 5a-5d. As described above, under the iSCSI standard, the host apparatus 3 serves as the initiator and the storage apparatus 5 serves as the target.

Here, considered is a situation where the storage apparatus 5b is removed from the storage system 4. This kind of situation may arise when the storage apparatus 5b is to be replaced (removed). Meanwhile, the storage system 4 needs to continue providing the data storage service to the host apparatus 3b.

If the storage apparatus 5b is to be removed from the storage system 4, the other storage apparatuses 5a, 5c, and 5d will take over the logical units LU that were being provided by the storage apparatus 5b. Which and how the storage apparatuses 5 will take over the logical units LU is decided depending on the takeover arbitration processing by the storage apparatuses 5. In FIG. 27 the logical units LU of the storage apparatus 5b that were taken over are shown with a broken line, and the logical units LU that were taken over from the storage apparatus 5b are shaded.

With the storage system 4, in order to enable the host apparatus 3b to continue using the respective logical units LU that were being provided by the storage apparatus 5b in an equivalent manner, one storage apparatus 5 among the storage apparatuses 5a, 5c, and 5d that respectively took over the logical units LU undertakes a portal apparatus, and thereby receives the I/O requests from the host apparatus 3b. In this example, it may be assumed that the storage apparatus 5c assumes the function of the portal apparatus. In addition, the storage apparatus 5c as the portal apparatus receives, in addition to the I/O requests from the host apparatus 3c, the I/O requests from the host apparatus 3b. In conjunction with this, the host apparatus 3c switches the path so that the storage apparatus 5c becomes the target as the portal apparatus in substitute for the storage apparatus 5b. Such path switching is performed with a well-known path switch program installed in the host apparatus 3. Alternatively, this may also be realized by the storage apparatus 5 as the portal apparatus taking over the target information (i.e., iSCSI name, IP address and TCP port number) of the storage apparatus 5b.

Moreover, in order to make it appear to the host apparatus 3c that the logical unit LU of the storage apparatus 5b exists, the storage apparatus 5c as the portal apparatus distributes, if required, the I/O requests from the host apparatus 3c to the logical units LU that were being provided by the storage apparatus 5b to the storage apparatuses 5a and 5d that took over the logical units LU. Specifically, the storage apparatus 5c as the portal apparatus uses the external storage configuration technology to position the storage apparatuses 5a and 5d as external storage apparatuses (slave apparatuses).

Figure 3:
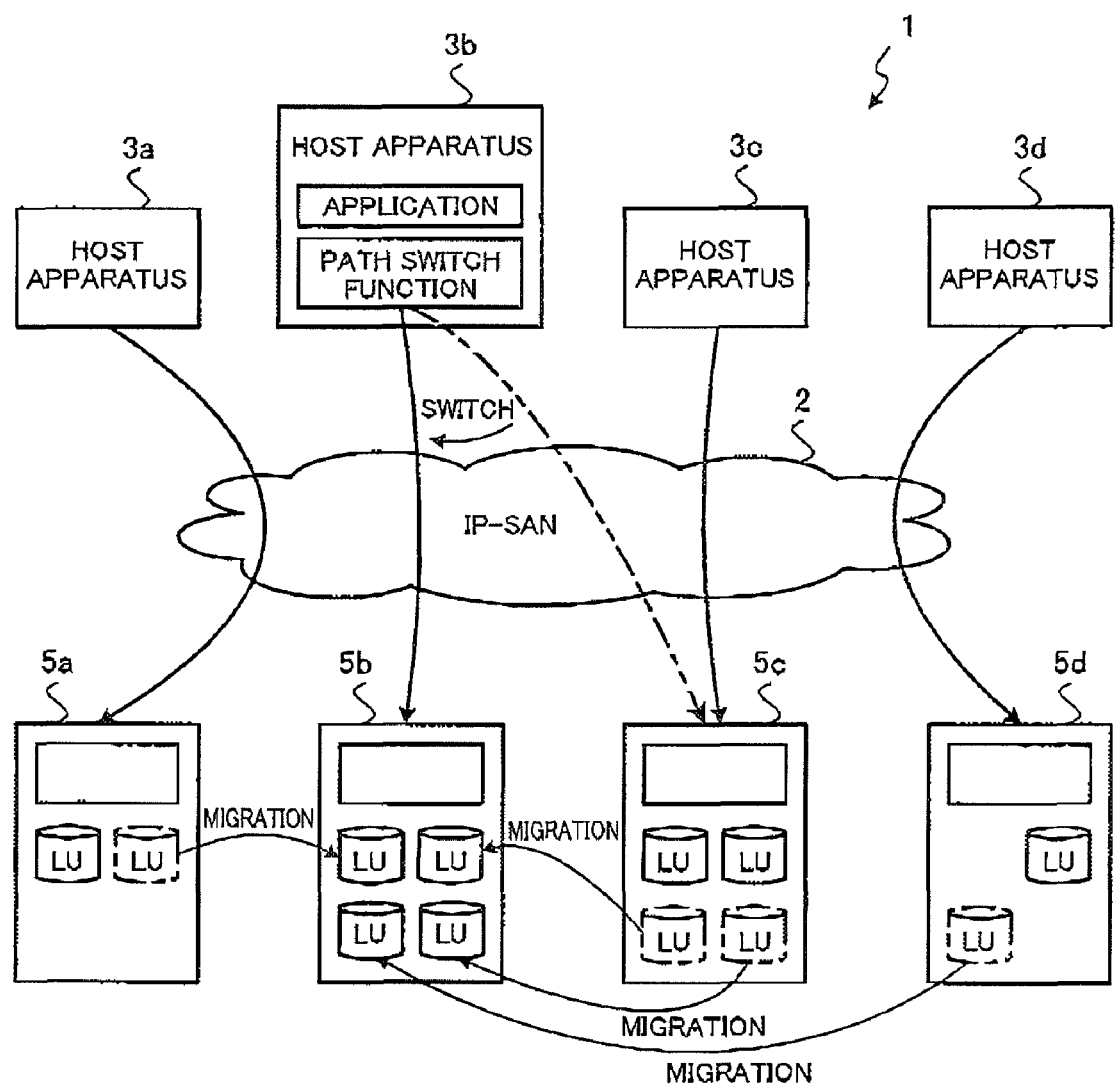
FIG. 3 is a diagram conceptually explaining the cooperative distributed operation of storage apparatuses in the storage system according to an embodiment of the present invention.

FIG. 3 is a diagram conceptually showing the cooperative distributed operation of the storage apparatus 5 in the storage system 4 according to an embodiment of the present invention. Specifically, FIG. 3 shows the takeover of the logical units in a case where a new storage apparatus 5 is added after one storage apparatus 5 is removed from the storage system 4.

In other words, a case is considered where a new storage apparatus 5b' is added to the storage system 4 in the status illustrated in FIG. 2.

Here, the new storage apparatus 5b' takes over the logical units LU that were taken over by the storage apparatuses 5a, 5c and 5d. Specifically, the logical units LU of the storage apparatuses 5a, 5c and 5d are consolidated in the new storage apparatus 5b'. In addition, the host apparatus 3b switches the path using the path switch function so that the storage apparatus 5b' becomes the new target.

Thus, when a certain storage apparatus 5 is to be removed from the storage system 4, the remaining storage apparatuses 5 dynamically take over the logical units of the storage apparatus 5 to be removed, and the system configuration can be changed flexibly. Even in a case of adding a new storage apparatus 5 after removing a certain storage apparatus 5, since the logical units of the removed storage apparatus 5 will be dynamically taken over by the new storage apparatus 5, the system configuration can be changed flexibly.

Figure 4:
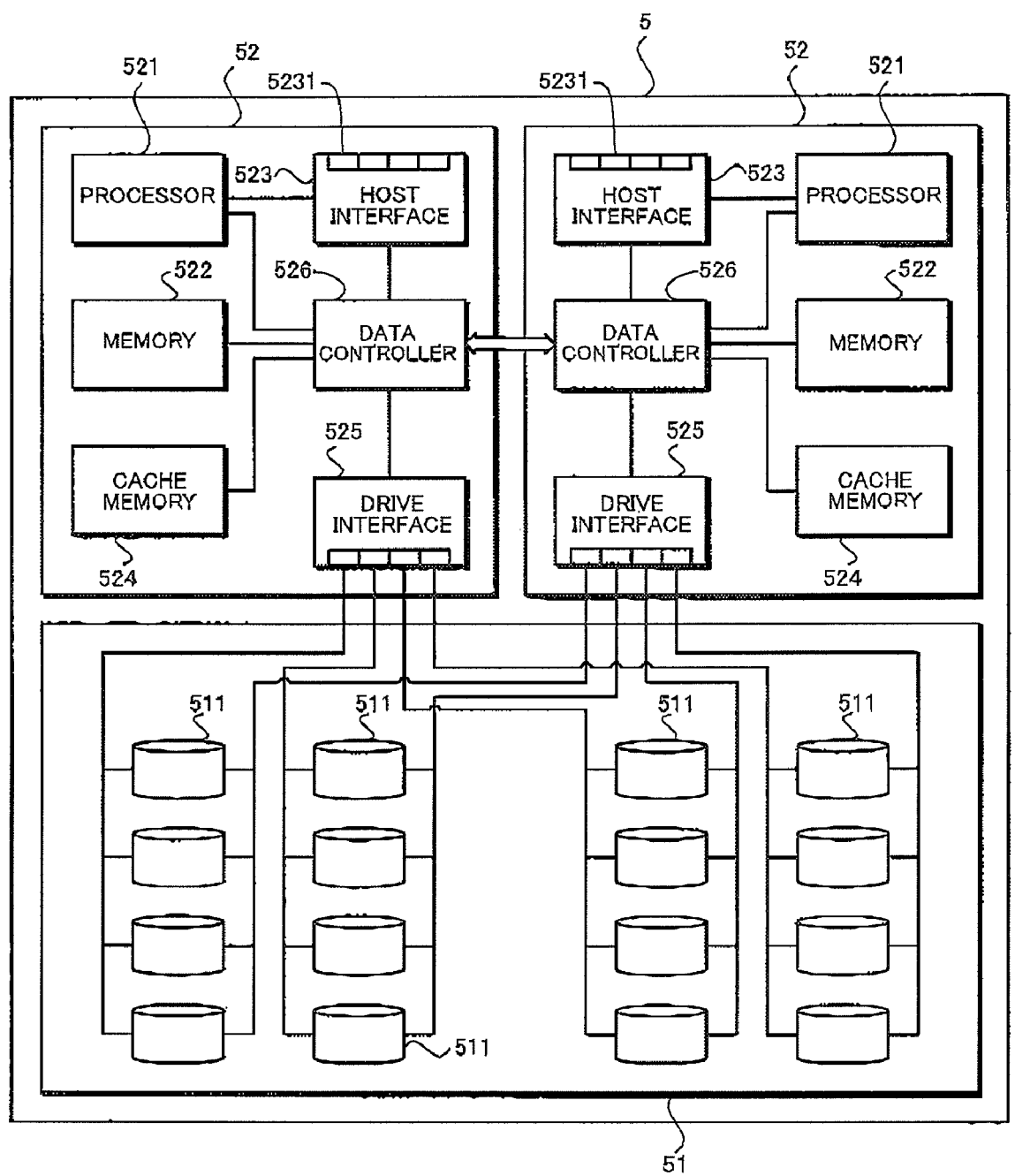
FIG. 4 is a diagram showing the configuration of a storage apparatus according to an embodiment of the present invention.

FIG. 4 is a diagram showing the configuration of the storage apparatus 5 according to an embodiment of the present invention. As described above, the storage apparatus 5 comprises drive units 51 and controller units 52, and the storage apparatus 5 of this embodiment adopts a redundant configuration as shown in FIG. 4. Specifically, the controller unit 52 of the storage apparatus 5 is duplexed, and the path to the hard disk drive 511 in the drive unit 51 is also duplexed.

The controller unit 52 comprises a processor 521, a memory 522, a host interface 523, a cache memory 524, a drive interface 524, and a data controller 526.

Figure 5:
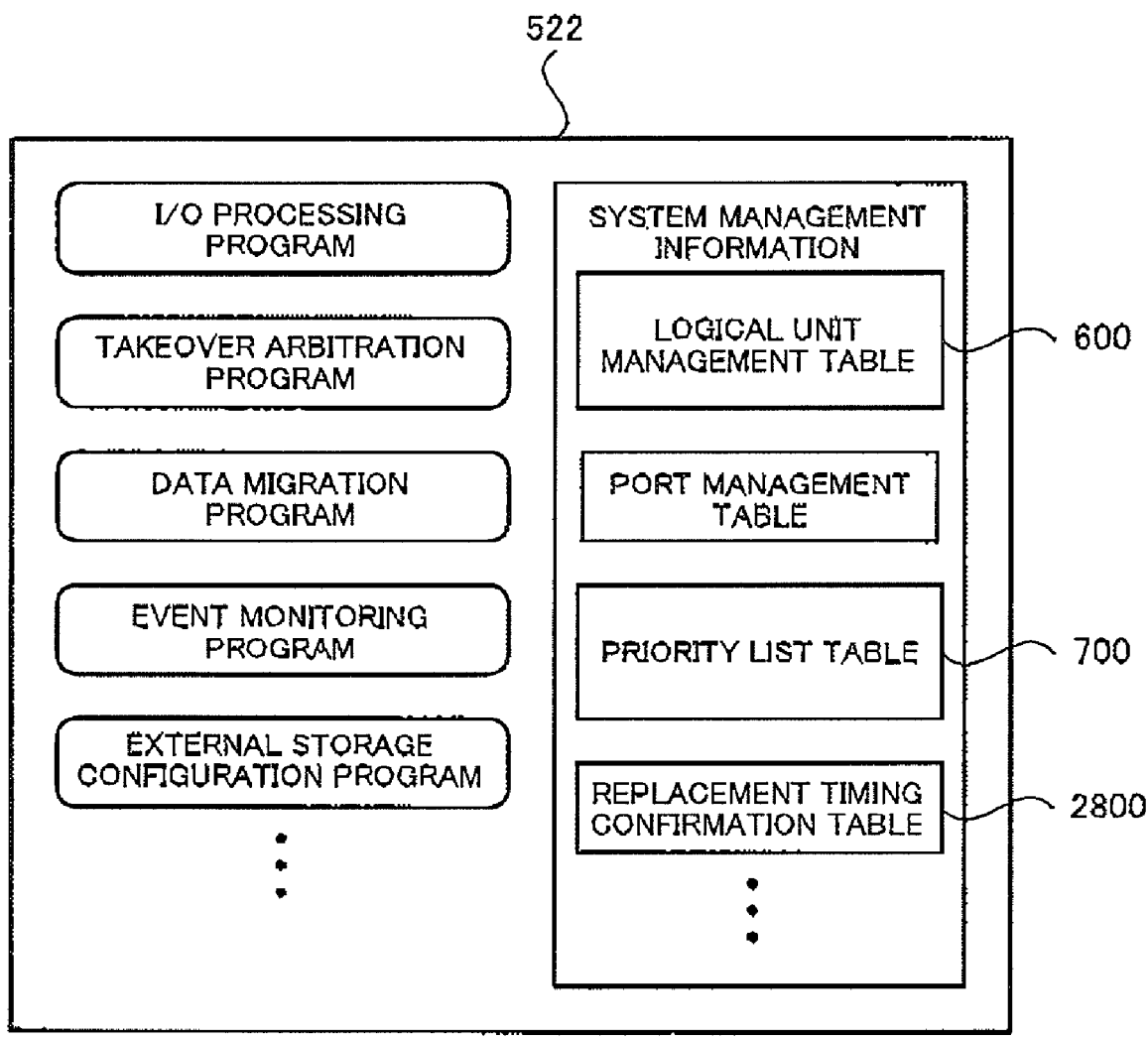
FIG. 5 is a diagram showing the memory contents of the storage apparatus according to an embodiment of the present invention.

The processor 521 controls the overall controller unit 42 by executing the various control programs retained in the memory 522 that functions as a main memory. The memory 422 retains, for example, as shown in FIG. 5, an I/O processing program, a takeover arbitration program, a data migration program, an event monitoring program, and an external storage program, as well as system management information including a logical unit management table 600 and a priority list table 800.

The host interface 523 comprises a plurality of ports 5231, and is a network interface for communicating with the host apparatus 3 operatively connected to the port 5231 via the network 2. In order to reduce the load of the processor 521, the host interface 523 may be provided with an iSCSI protocol in addition to the TCP/IP protocol. The host interface 523 may referred to as a host bus adapter.

The cache memory 524 is a memory for temporarily storing (caching) data to be exchanged between the host interface 523 and the device interface 525 in order to provide high response performance to the host apparatus 3. The cache memory 524 is typically configured from a volatile memory such as DRAM, but it may also be partially or entirely configured from a nonvolatile memory such as a flash memory.

The device interface 525 comprises a plurality of ports, and is an interface for controlling the I/O access to the disk device 41 operatively connected to the corresponding port via a disk channel. Specifically, the device interface 525 retrieves the data cached in the cache memory 524 and stores (destages) such data in the corresponding block of the drive unit 51, as well as reads data from the block in the drive unit 51 and writes (stages) such data in the cache memory 424. For example, when a read request is received from the host apparatus 3 and the requested data does not exist in the cache memory 524, destaging is performed as need in order to secure a cache area, and the requested data is thereafter staged to the cache memory 524.

The data controller 526 is a peripheral chipset that operatively connects the processor 521, the memory 522, the host interface 523, the cache memory 524, and the device interface 525 described above, and controls the flow of data among these components. The data controller 526 is also connected to the data controller 526 of the other controller unit 52.

FIG. 6 is a diagram showing an example of the logical unit management table 600 in the storage apparatus 5 according to an embodiment of the present invention. The logical unit management table 600 is a table for associating the logical units LU to be recognized by the host apparatus 3 and the logical units LU to be internally recognized by the storage apparatus 5 itself retaining the logical unit management table 600.

Referring to FIG. 6, the logical unit management table 600 includes a host logical unit number 601, a host start address 602, a capacity 603, an apparatus logical unit number 604, an apparatus start address 605, a master apparatus ID 606, a slave apparatus ID 607, and a status 608.

The host logical unit number 601 is a logical unit number of the logical units LU to be recognized by the host apparatus 3. The host start address 602 is the start address of the logical units LU to be recognized by the host apparatus [3], and the capacity 603 shows the capacity of the relevant logical unit LU.

The apparatus logical unit number 604 is a logical unit number for uniquely identifying the logical units LU under the control of the self-storage apparatus 5. Specifically, the apparatus logical unit number 604 is used to differentiate the logical units LU (hereinafter referred to as the "internal logical units ILU") formed inside the self-storage apparatus 5 and the logical units LU (hereinafter referred to as the "external logical units ELU") formed inside the storage apparatus 5 in an external storage configuration relationship. In addition, the external logical units ELU can be further classified into master external logical units MELU and slave external logical units SELU. The master external logical unit MELU is the external logical unit ELU when the self-storage apparatus 5 is the master apparatus in relation to the other storage apparatus 5, and the slave external logical unit SELU is the external logical unit ELU when the self-storage apparatus 5 is the slave apparatus in relation to the other storage apparatus 5. The master external logical unit MELU is a virtual logical unit for virtually showing a logical unit LU to the host apparatus 3, but in reality it is the corresponding slave external logical unit SELU of the storage apparatus 5 identified with the slave apparatus ID 607 described later.

The apparatus start address 605 is the start address of the [internal] logical unit ILU or the external logical unit ELU.

The master apparatus ID 606 is the identifier of the storage apparatus 5 in a master relationship when viewed from the self-storage apparatus 5, and the slave apparatus ID 607 is the identifier of the storage apparatus 5 in a slave relationship when viewed from the self-storage apparatus 5. For instance, an iSCSI name can be used as the master apparatus ID 606 or the slave apparatus ID 607.

The status 608 shows the status of the logical units LU. The status 608 includes values such as "Normal," "Migrating," "Failure," or "Inactive."

Figure 7:
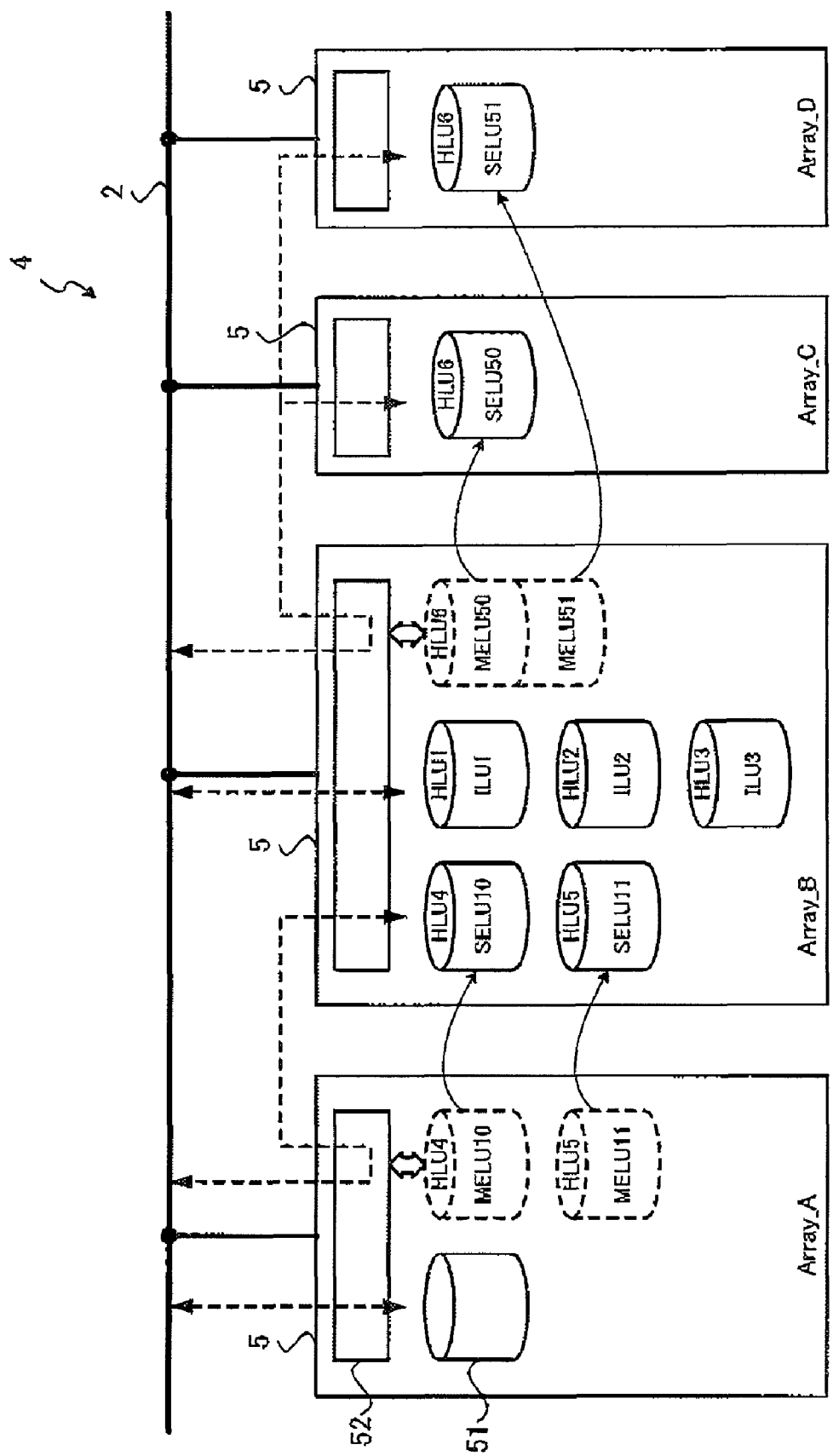
FIG. 7 is a diagram showing the relationship among the logical units of the respective storage apparatuses in the storage system according to an embodiment of the present invention.

FIG. 7 is a diagram showing the relationship among the logical units LU of the respective storage apparatuses 5 in the storage system 1 according to an embodiment of the present invention. Specifically, FIG. 7 is a view showing a frame format of the logical units LU of the storage apparatus 5 retaining the logical unit management table 600 shown in FIG. 6, and the logical units LU of the other storage apparatuses 5. Here, it may be assumed that the storage apparatus 5 indicated as "Array_B" (hereinafter referred to as the "storage apparatus 5B") is retaining the logical unit management table 600 shown in FIG. 6.

Specifically, the storage apparatus 5B internally retains internal logical units ILU-1 to ILU-3 respectively corresponding to host logical units HLU-1 to HLU-3.

In addition, the storage apparatus 5B includes, as the external storage apparatuses of the storage apparatus 5A, the slave external logical units SELU 10 and SELU 11 respectively corresponding to the host logical units HLU-4 and HLU-5. In other words, the storage apparatus 5B includes the slave external logical units SELU 10 and 11 as the slave units of the storage apparatus 5A. Here, although the storage apparatus 5A causes the host apparatus 3 to virtually recognize the host logical unit HLU-1, in reality it exists in the storage apparatus 5B as the external storage apparatus.

Moreover, the storage apparatus 5B includes the master external logical units MELU 50 and 51 corresponding to the host logical unit HLU-6. Specifically, the storage apparatus 5B is connecting the storage apparatus 5c and the storage apparatus 5D as external storage apparatuses (slave apparatuses). Thus, the storage apparatus 5B distributes the I/O requests to the host logical unit HLU-6 to the logical units LU of the storage apparatus 5C or 5D in accordance with the designated logical address. The logical unit LU of the storage apparatus 5C or 5D is recognized as the slave external logical unit SELU in its logical unit management table 600.

As apparent from the above, the logical unit management table 600 shown in FIG. 6 shows that while the storage apparatus 5B acts as the external storage apparatus (slave apparatus) of the storage apparatus 5 (portal apparatus) on the one hand, it also acts as the portal apparatus (master apparatus) to the storage apparatuses 5C and 5D connected as the external storage apparatuses (slave apparatuses).

FIG. 8 is a diagram showing an example of the priority list table 800 in the storage apparatus 5 according to an embodiment of the present invention. The priority list table 800 is a table that sets forth the priority upon requesting the takeover of the non self-storage apparatuses 5 in the storage system 4.

As shown in FIG. 8, the priority list table 800 includes a priority 801, an apparatus ID 802, an operational status 803, an unused capacity 804, and an acceptance history 805.

The priority 801 shows the priority of the takeover request in which smaller the value, higher the priority. The priority 801 may also include equivalence.

The apparatus ID 802 is the identifier for uniquely identifying the storage apparatuses 5 in the storage system 4. The operational status 803 shows the operational status of the storage apparatus 5 and includes values such as "Active" and "Inactive."

The unused capacity 804 shows the unused capacity value of the storage apparatus 5. The unused capacity 804 does not have to be the actual unused capacity of the storage apparatus 5, and may also be the capacity value that is providable by the storage apparatus 5.

The acceptance history 805 shows the past history regarding the involvement of the storage apparatus 5 in the takeover of logical units LU in the storage system 4, and includes a takeover accepted count 805a and a takeover requested count 805b. The takeover accepted count 805a shows the number of times that the self-storage apparatus 5 accepted (cooperated in) the takeover of logical units from other storage apparatuses 5. In contrast, the takeover requested count 805b shows the number of times that the self-storage apparatus 5 requested the takeover of logical units to other storage apparatuses 5 (i.e., number of times that the other storage apparatuses 5 accepted the takeover of logical units from the self-storage apparatus 5).

Figures 9A, 9B:
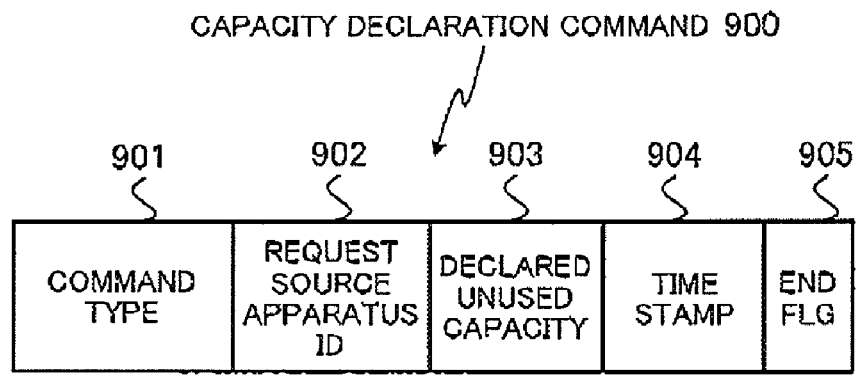
FIG. 9A and FIG. 9B are diagrams showing an example of a format of a capacity declaration command to be issued by the storage apparatus according to an embodiment of the present invention.

The storage apparatus 5 periodically or randomly collects such information from the other storage apparatuses 5 based on a capacity declaration command 900 shown in FIG. 9A and FIG. 9B, and updates the priority list table 800. The storage apparatus 5 that received the capacity declaration command 900 sorts the other storage apparatuses 5 in which the operational status 803 is "Active" in descending order based on the unused capacity 804, the takeover accepted count 805a, and the takeover requested count 805b.

Figure 10:
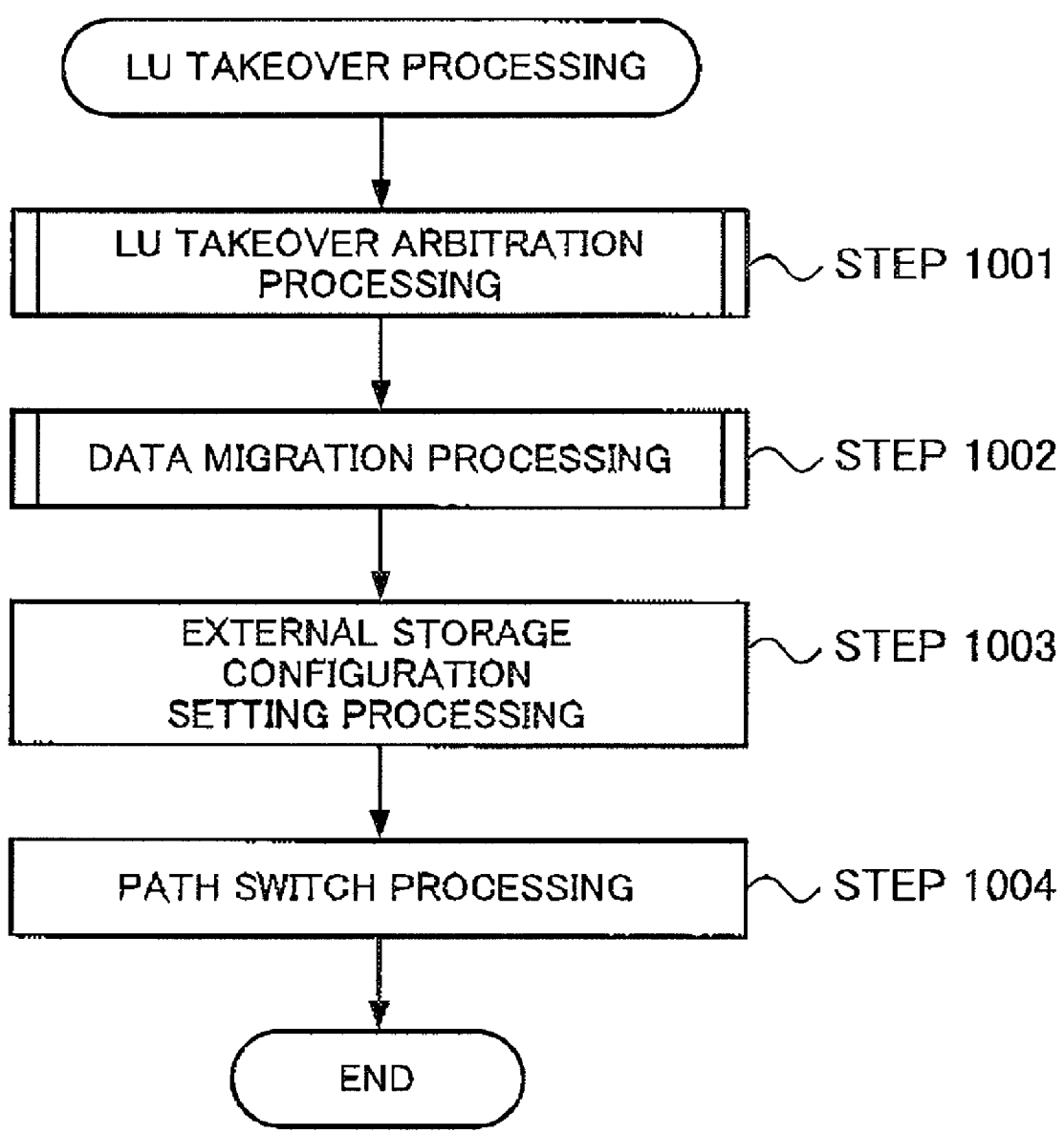
FIG. 10 is the overall flowchart for explaining the logical unit takeover processing in the storage system according to an embodiment of the present invention.

FIG. 10 is a general flowchart explaining the logical unit takeover processing in the storage system 4 according to an embodiment of the present invention. The logical unit takeover processing is performed when triggered by a certain event, for instance, at the point in time a certain storage apparatus 5 predicts the occurrence of a failure due to aged deterioration or the like. The event monitoring program in the storage apparatus 5 predicts the occurrence of this kind of failure with the S.M.A.R.T. function or the like. Alternatively, the logical unit migration processing may be performed upon receiving a command from the management apparatus 6.

Specifically, as shown in FIG. 10, one storage apparatus 5 performs the logical unit takeover arbitration processing when triggered by a certain event (STEP 1001). The one storage apparatus 5 is an apparatus that should be removed from the storage system 4 since the occurrence of a failure is expected. Since this storage apparatus 5 acts as the apparatus to request the takeover of logical units LU to other storage apparatuses 5, it is referred to as the "takeover requesting apparatus." The logical unit takeover arbitration processing is processing for deciding the other storage apparatuses 5 (hereinafter referred to as the "takeover apparatuses") to take over the logical units LU, and deciding a specific storage apparatus 5 among the takeover apparatuses to become the portal apparatus. The logical unit takeover arbitration processing will be explained later in detail with reference to FIG. 13.

When the logical unit takeover arbitration processing is complete, data migration processing is executed between the logical units LU of the storage apparatus 5 as the takeover requesting apparatus and the logical units LU of the storage apparatus 6 as the takeover apparatus (STEP 1002). Thus, if there are a plurality of storage apparatuses 5 as the takeover apparatuses, the data migration processing is executed respectively between the logical units LU of the storage apparatus 5 as the takeover requesting apparatus and the logical units LU of each storage apparatus 5 as the takeover apparatus. The data migration processing is executed by setting the logical units LU of the storage apparatuses 5 as the takeover requesting apparatus and the takeover apparatus respectively as the master external logical units MELU and the slave external logical units SELU.

Even during the execution of the data migration processing, the storage system 4 (i.e., storage apparatus 5 as the takeover requesting apparatus) needs to continue receiving I/O requests from the corresponding host apparatus 3, and the data consistency must be maintained even in the foregoing case. Thus, the storage apparatus 5 as the takeover requesting apparatus also sends differential data, which is based on the I/O requests received immediately after the start of data migration processing up to now, to the storage apparatus 5 as the takeover apparatus. The logical units LU of the storage apparatus 5 as the takeover requesting apparatus can thereby be taken over by the logical units LU of the storage apparatuses 5 as the takeover apparatuses while maintaining data consistency.

When the data migration processing is complete, external storage configuration setup processing is executed among the storage apparatuses 5 as the takeover apparatuses (STEP 1003). Namely, the storage apparatus 5 as the portal apparatus allocates the logical units LU (i.e., slave external logical units SELU) of the other storage apparatuses 5 as the takeover apparatuses to the master external logical units MELU.

Path switch processing is performed in accordance with the setting of the external storage configuration (STEP 1004). Typically, the host apparatus 3 uses the path switch function to change the iSCSI name and the network portal for changing the target from the storage apparatus 5 as the takeover requesting apparatus to the storage apparatus 5 as the portal apparatus. Alternatively in substitute for making changes in the host apparatus 3, the storage apparatus 5 as the portal apparatus may take over the iSCSI name and the network portal (IP address and TCP port number) from the storage apparatus 5 as the takeover requesting apparatus.

By way of this, the logical units LU of a certain storage apparatus 5 in the storage system 4 are dynamically migrated to other storage apparatuses 5 when triggered by a certain event, and taken over by such other storage apparatuses 5. One storage apparatus 5 among the storage apparatuses 5 that took over the logical units LU acts as the portal apparatus, and uses the external storage function to distribute the I/O requests from the host apparatus 3 to the other storage apparatuses 5a and 5d. Accordingly, the host apparatus 3 can continue using the logical units LU that were being provided by the storage apparatus 5 as the takeover requesting apparatus via the storage apparatus 5 as the portal apparatus.

The respective storage apparatuses 5 perform the logical unit takeover arbitration processing in a cooperative distributed manner by exchanging the commands shown in FIG. 11 and FIG. 12. FIG. 11A to FIG. 11C show an example of a command format to be used in the takeover request protocol, and FIG. 12A and FIG. 12B show an example of a command format to be used in the approval protocol in response to the takeover request.

Figure 13:
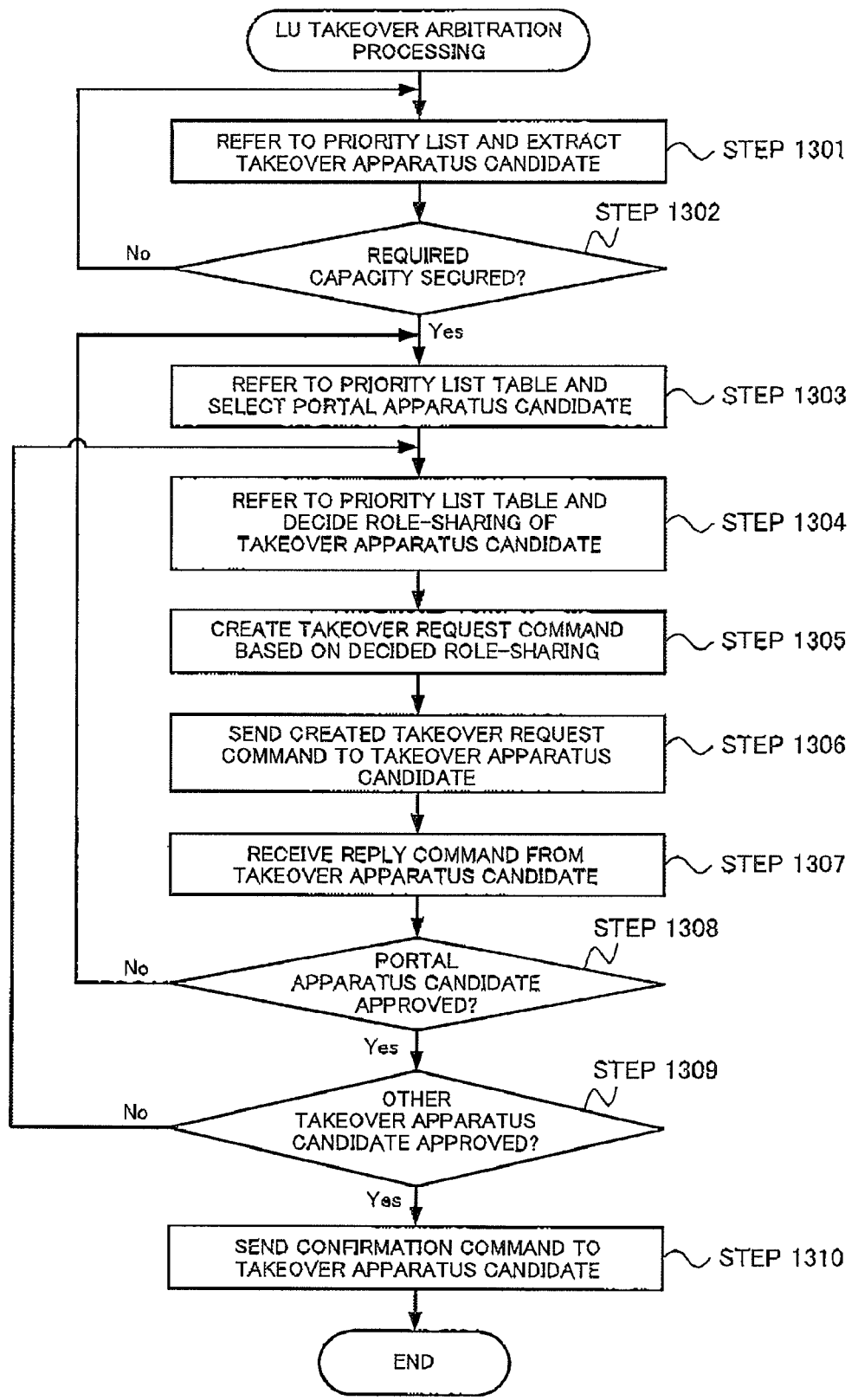
FIG. 13 is a flowchart explaining the details of the logical unit takeover arbitration processing in the storage apparatuses according to an embodiment of the present invention.
Figure 14:
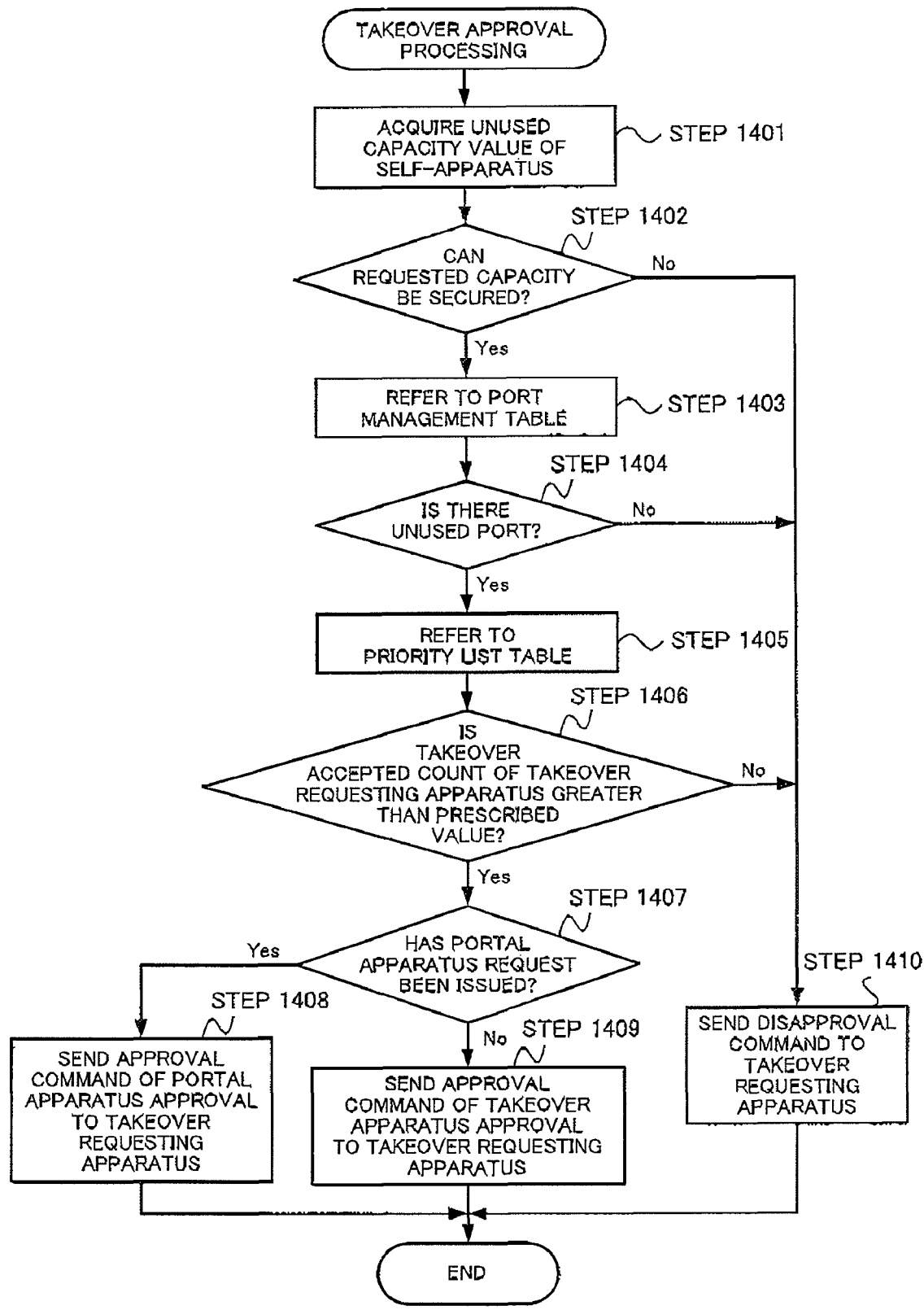
FIG. 14 is a flowchart explaining the details of the logical unit takeover arbitration processing in the storage apparatuses according to an embodiment of the present invention.

FIG. 13 and FIG. 14 are flowcharts explaining the details of the logical unit takeover arbitration processing in the storage apparatus 5 according to an embodiment of the present invention.

Referring to FIG. 13, the storage apparatus 5 as the takeover requesting apparatus foremost refers to the priority list table 800, and extracts a storage apparatus 5 to become a takeover apparatus candidate (STEP 1301).

When the storage apparatus 5 as the takeover requesting apparatus extracts one takeover apparatus candidate, it determines whether or not the capacity required by its logical units LU can be secured with the extracted takeover apparatus candidate (STEP 1302). If the storage apparatus 5 as the takeover requesting apparatus determines that the required capacity cannot be secured with the extracted takeover apparatus candidate (STEP 1302; No), it sequentially extracts takeover apparatus candidates until the required capacity can be secured (STEP 1301). The takeover apparatus candidates are typically selected in order from the highest ranking candidates in the priority list table 800.

If the storage apparatus 5 as the takeover requesting apparatus determines that the required capacity has been secured (STEP 1302; No), it selects one portal apparatus candidate among the extracted takeover apparatus candidates (STEP 1303). The portal apparatus candidate may be selected from the highest ranking candidate in the priority list table 800, or selected randomly among the extracted takeover apparatus candidates.

Subsequently, the storage apparatus 5 as the takeover requesting apparatus refers to the priority list table 800 and decides the role-sharing of the takeover apparatus candidates. More specifically, the storage apparatus 5 as the takeover requesting apparatus decides the storage capacity and the like to be requested to the respective takeover apparatus candidates. The storage apparatus 5 as the takeover requesting apparatus creates a takeover request command as shown in FIG. 11B based on the decided role-sharing (STEP 1305), and broadcasts such takeover request command to the other storage apparatus 5 in the storage system 4 (STEP 1306).

If the other storage apparatus 5 that received the takeover request command is designated as the takeover apparatus candidate, it determines whether to approve the acceptance as the portal apparatus or the takeover apparatus, and uses a reply command to make a reply.

Referring now to FIG. 14, the other storage apparatus 5 that received the takeover request command acquires the unused capacity value of the drive unit 51 (STEP 1401), and determines whether the requested capacity can be secured (STEP 1402) or not. If the other storage apparatus 5 determines that the requested capacity cannot be secured (STEP 1402; No), it creates a disapproval command and sends it to the storage apparatus 5 as the takeover requesting apparatus (STEP 1410).

Meanwhile, if the other storage apparatus 5 that received the takeover request command determines that the requested capacity can be secured (STEP 1402; Yes), it thereafter refers to the port management table (STEP 1403), and determines whether there is an available port (STEP 1404). If the other storage apparatus 5 determines that there is no available port (STEP 1404; No), it creates a disapproval command and sends it to the storage apparatus 5 as the takeover requesting apparatus (STEP 1410).

Meanwhile, if the other storage apparatus 5 that received the takeover request command determines that there is an available port (STEP 1404; Yes), it thereafter refers to the priority list table 800 (STEP 1405), and determines whether or not the takeover requested count of the takeover requesting apparatus is greater than a prescribed count (STEP 1406). This means that greater the takeover requested count, the more likely that the storage apparatus 5 that received the takeover request will approve the takeover. The step of determining the takeover requested count may be omitted upon implementation. If the other storage apparatus 5 determines that the takeover requested count is not greater than a prescribed count (STEP 1406; No), it creates a disapproval command and sends it to the storage apparatus 5 as the takeover requesting apparatus (STEP 1410).

Meanwhile, if the other storage apparatus 5 that received the takeover request command determines that the takeover requested count is greater than a prescribed count (STEP 1406; Yes), it determines whether or not it is being requested to become the portal apparatus in the takeover request command (STEP 1407). If the other storage apparatus determines that it is being requested to become the portal apparatus (STEP 1407; Yes), it creates an approval command for approving the portal apparatus, and sends the created approval command to the storage apparatus 5 as the takeover requesting apparatus (STEP 1408). Meanwhile, if the other storage apparatus determines that it is not being requested to become the portal apparatus (STEP 1407; No), it creates a standard approval command for approving the takeover apparatus, and sends the created standard approval command to the storage apparatus 5 as the takeover requesting apparatus (STEP 1408).

Returning to FIG. 13, the storage apparatus 5 as the takeover requesting apparatus thereafter receives a reply command sent from the other storage apparatuses 5 in response to the takeover request command (STEP 1307). The reply command includes, as shown in FIG. 12B, a status for approving or disapproving the takeover.

Subsequently, the storage apparatus 5 as the takeover requesting apparatus determines whether the reply command received from the storage apparatus 5 as the portal apparatus candidate contains an approval status (STEP 1308). If the storage apparatus 5 as the takeover requesting apparatus determines that the reply command does not contain an approval status (STEP 1308; No), it returns to the processing at STEP 1303 in order to once again decide the role-sharing of the takeover apparatus candidates, including the selection of the portal apparatus candidate.

Meanwhile, if the storage apparatus 5 as the takeover requesting apparatus determines that the reply command contains an approval status (STEP 1308; Yes), it determines whether or not the reply command received from the other storage apparatus 5 as the takeover apparatus candidate contains an approval status (STEP 1309). If the storage apparatus 5 as the takeover requesting apparatus determines that the reply command does not contain an approval status (STEP 1309; No), it returns to the processing at STEP 1304 in order to once again decide the role-sharing of the takeover apparatus candidates.

If the storage apparatus 5 as the takeover requesting apparatus determines that the reply command received from the other storage apparatus as the takeover apparatus candidate contains an approval status (STEP 1309; Yes), it sends a confirmation command to the storage apparatus 5 as the takeover apparatus candidate (STEP 1310). When the storage apparatus 5 as the takeover apparatus candidate receives the confirmation command, it becomes the takeover apparatus and takes over the logical units LU. The storage apparatus 5 as the takeover apparatus will be able to recognize which storage apparatus 5 accepted the role as the portal apparatus based on a confirmation command as shown in FIG. 11C.

Thus, the storage apparatuses 5 in the storage system 4 perform the logical unit takeover arbitration processing in a cooperative distributed manner in the relationship of the takeover requesting apparatus and the takeover apparatus candidates.

Figure 15:
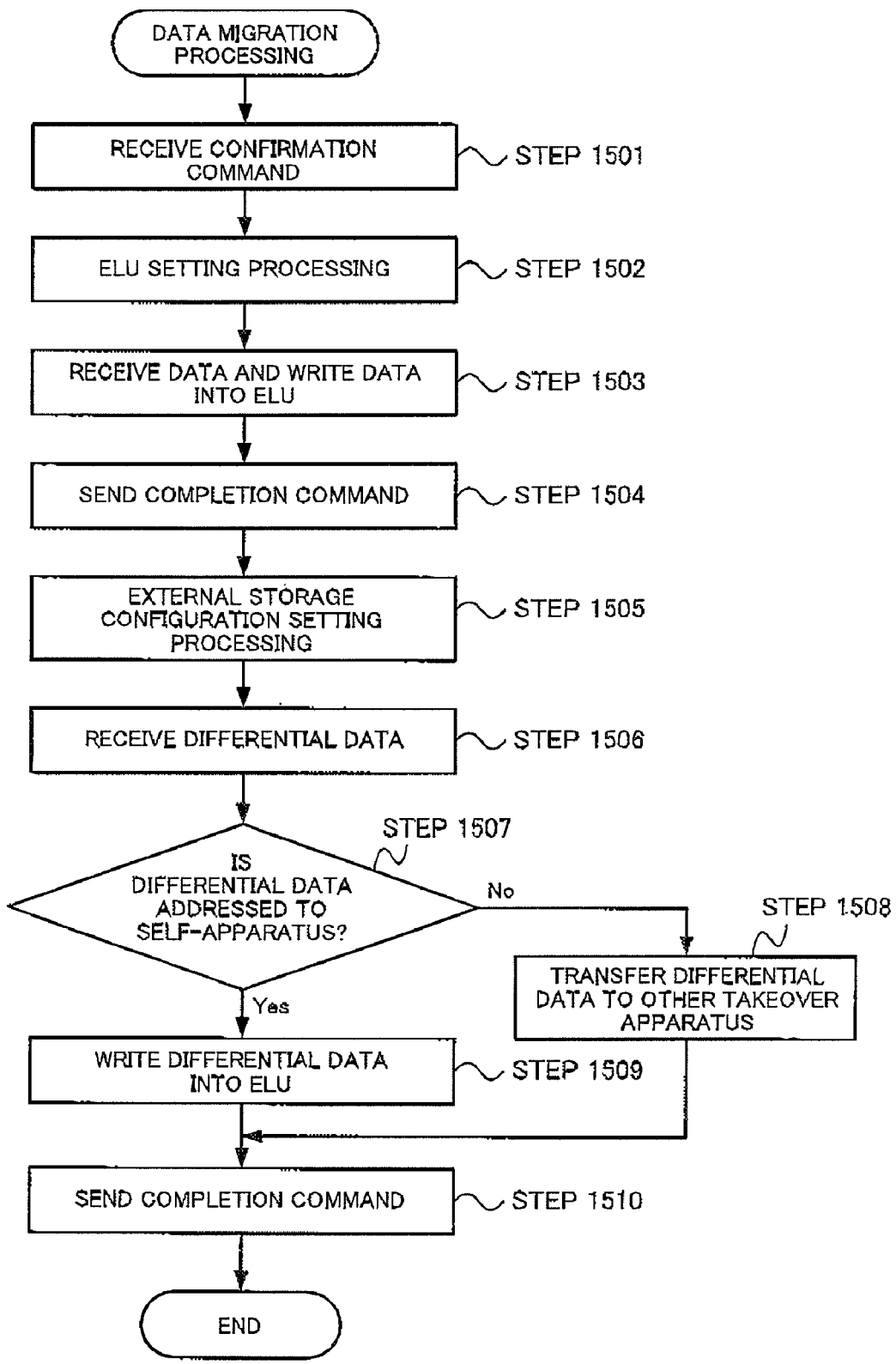
FIG. 15 is a flowchart explaining the data migration processing in the storage apparatus according to an embodiment of the present invention.

FIG. 15 is a flowchart explaining the data migration processing in the storage apparatus 5 according to an embodiment of the present invention. Specifically, FIG. 15 explains the data migration processing for the storage apparatus 5 as the portal apparatus to take over the logical units LU from the storage apparatus 5 as the takeover requesting apparatus.

As shown in FIG. 15, when the storage apparatus 5 as the portal apparatus receives a confirmation command (see FIG. 11C) from the storage apparatus 5 as the takeover requesting apparatus (STEP 1501), it updates the logical unit management table 600 based on the confirmation command, creates an external logical unit ELU (i.e., a slave external logical unit SELU at this point in time), and allocates a port to the external logical unit ELU in order to receive data from the storage apparatus 5 as the takeover requesting apparatus (STEP 1502).

The storage apparatus 5 as the portal apparatus then receives the data in the migration source logical units LU sent from the storage apparatus 5 as the takeover requesting apparatus, and writes such data into the created external logical unit ELU (STEP 1503). When the storage apparatus 5 as the takeover apparatus completes the writing of the sent data, it sends a completion command to the storage apparatus 5 as the takeover requesting apparatus (STEP 1504).

The storage apparatus 5 as the portal apparatus thereafter updates the logical unit management table 600 to set the storage apparatuses other than itself as the takeover apparatus as the external storage apparatuses (slave apparatuses) (STEP 1505).

Next, the storage apparatus 5 as the portal apparatus receives the differential data in relation to the migration source logical units LU sent from the storage apparatus 5 as the takeover requesting apparatus (STEP 1506). Differential data is data that arises when the storage apparatus 5 as the takeover requesting apparatus receives a write request from the host apparatus 3 during the data transfer.

The storage apparatus 5 as the portal apparatus thereafter determines whether or not the differential data is addressed to its own logical unit LU (STEP 1507). If the storage apparatus 5 as the portal apparatus determines that the differential data is addressed to its own external logical unit ELU (STEP 1507; Yes), it writes the differential data into its own external logical unit ELU (STEP 1508). Contrarily, if the storage apparatus 5 as the portal apparatus determines that the differential data is addressed to an external logical unit ELU of a takeover apparatus other than itself (STEP 1507; No), it transfers the received differential data to the other storage apparatus 5 as the takeover apparatus having the destination external logical unit ELU via the port allocated for the external storage apparatus (STEP 1509).

When the storage apparatus 5 as the portal apparatus completes the writing of the received differential data or the transfer processing, it sends a completion command to the storage apparatus 5 as the takeover requesting apparatus (STEP 1509). The storage apparatus 5 as the portal apparatus thereafter updates the logical unit management table 600 to set its own external logical unit ELU as the internal logical unit ILU (STEP 1605), and then ends the logical unit takeover processing.

A specific example of the logical unit takeover processing in a case of removing one storage apparatus 5 from the storage system 4 of this embodiment is now explained with reference to FIG. 16 to FIG. 21.

Figure 16:
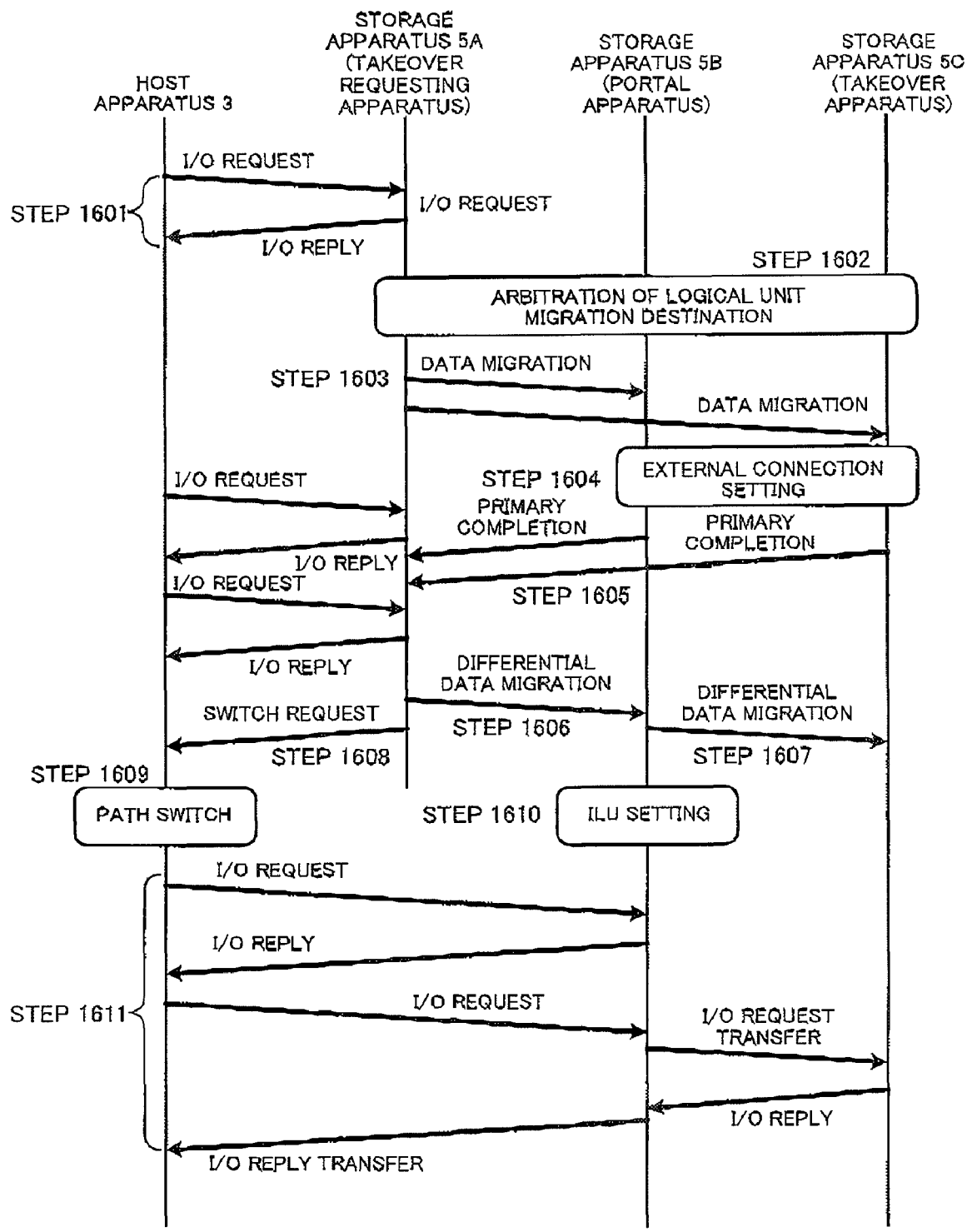
FIG. 16 is a sequence chart explaining the logical unit takeover processing in a case where one storage apparatus is removed from the storage system according to an embodiment of the present invention.

FIG. 16 is a sequence chart explaining the logical unit takeover processing in a case of removing one storage apparatus 5 from the storage system 4 according to an embodiment of the present invention.

Figure 17A:
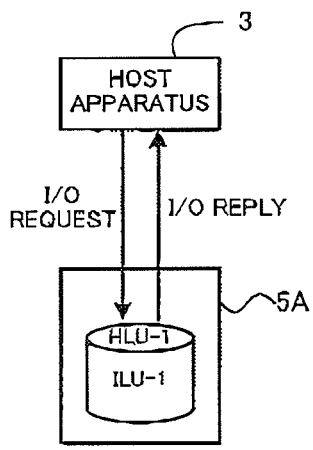
FIG. 17A to FIG. 17D are diagrams showing the relationship among the logical units of the storage apparatuses according to an embodiment of the present invention.

As shown in FIG. 16, it may be assumed that the host apparatus 3 is I/O accessing the logical unit LU of the corresponding storage apparatus 5A (STEP 1601). Here, the host apparatus 3 and the storage apparatus 5A (and its logical unit LU) are of a one-to-one relationship as shown in FIG. 17A. FIG. 18A through FIG. 18C show the logical unit management tables 600A to 600C of the respective storage apparatuses 5A-5C in the foregoing case. The logical unit management tables 600B and 600C of the storage apparatuses 5B and 5C show that the relationship with the host apparatus 3 is "NULL," and a logical unit LU may be defined in the relationship with each of the corresponding host apparatuses 3.

Figure 19:
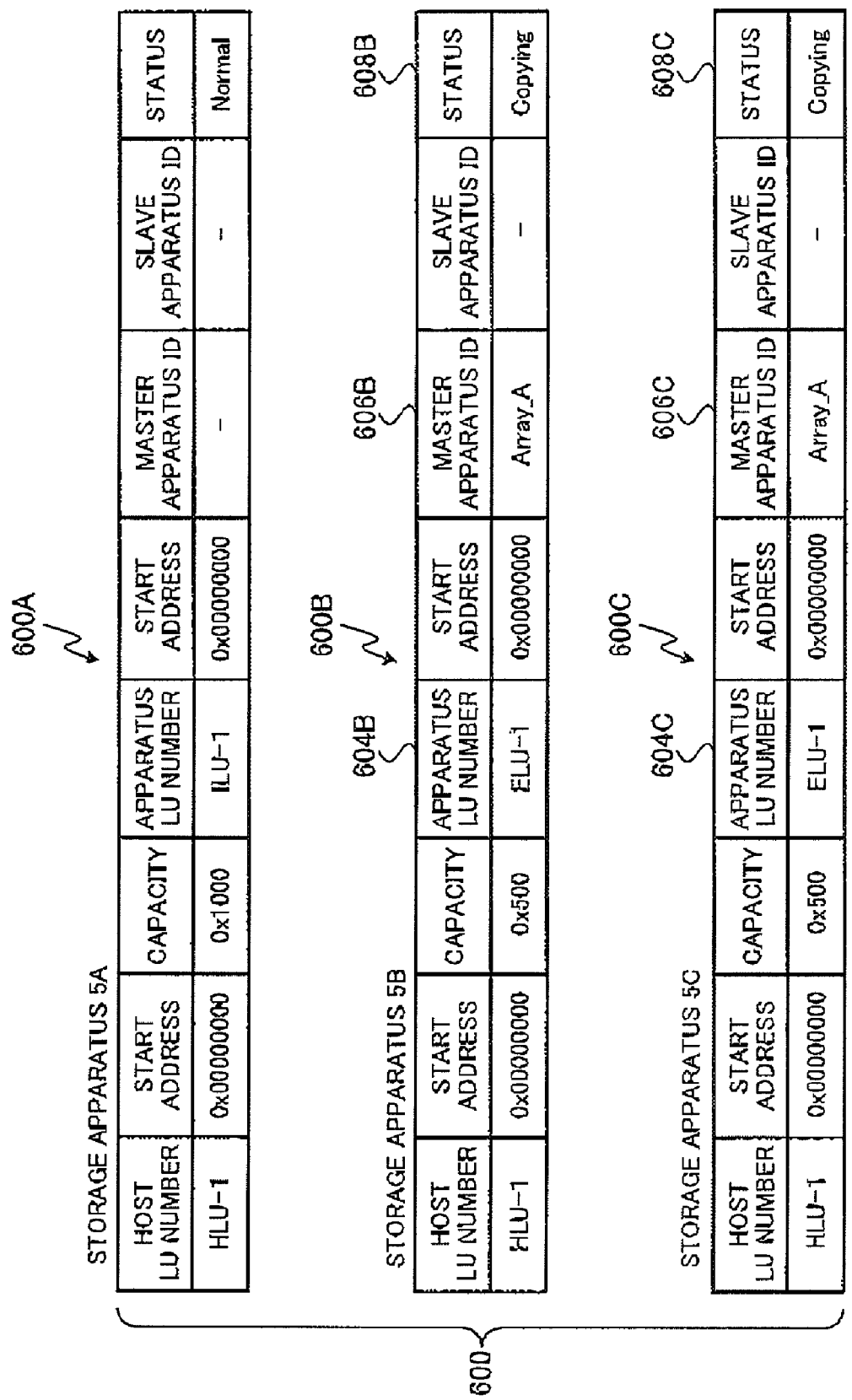
FIG. 19 is a diagram showing an example of the logical unit management table in the storage apparatus according to an embodiment of the present invention.

Triggered by a certain event, the storage apparatus 5A as the takeover requesting apparatus requests takeover arbitration to the other storage apparatuses 5 (STEP 1602). In this example, it may be assumed that the storage apparatus 5B accepted the role as the portal apparatus, and the storage apparatus 5C accepted the standard role as a takeover apparatus. Moreover, it may be assumed that the logical unit LU of the storage apparatus 5A was taken over by the storage apparatuses 5B and 5C. In this case, the logical unit LU of the storage apparatus 5A is taken over by being partitioned dually in a prescribed size. Thus, the storage apparatuses 5A to 5C update the logical unit management tables 600A to 600C as shown in FIG. 19. That is, the storage apparatuses 5B and 5C create a slave external logical unit SELU with the storage apparatus 5A as the master apparatus.

Figure 17B:
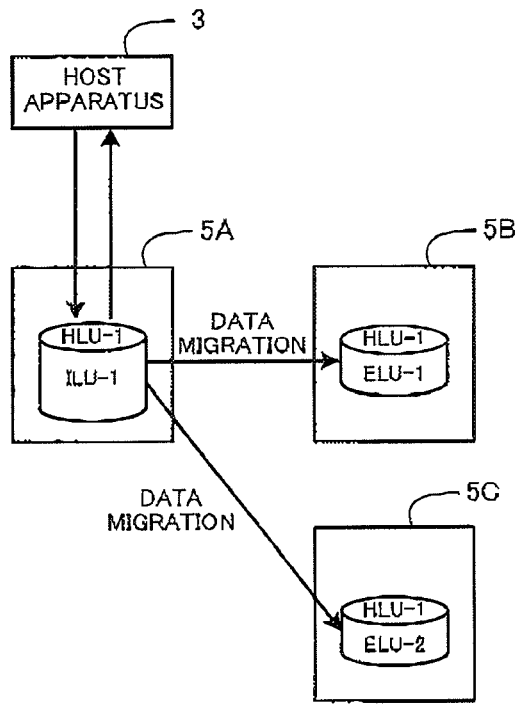

If the takeover arbitration is successful, the storage apparatus 5A sends the data in the logical volume LU to the storage apparatuses 5B and 5C, and the storage apparatuses 5B and 5C write the sent data into the created slave external logical volume SELU (STEP 1603). As described above, the logical volumes of the storage apparatus 5A are accessed based on the I/O request from the host apparatus 3 even during the data migration. FIG. 17B shows the relationship between the logical units LU during the data migration.

Figure 20:
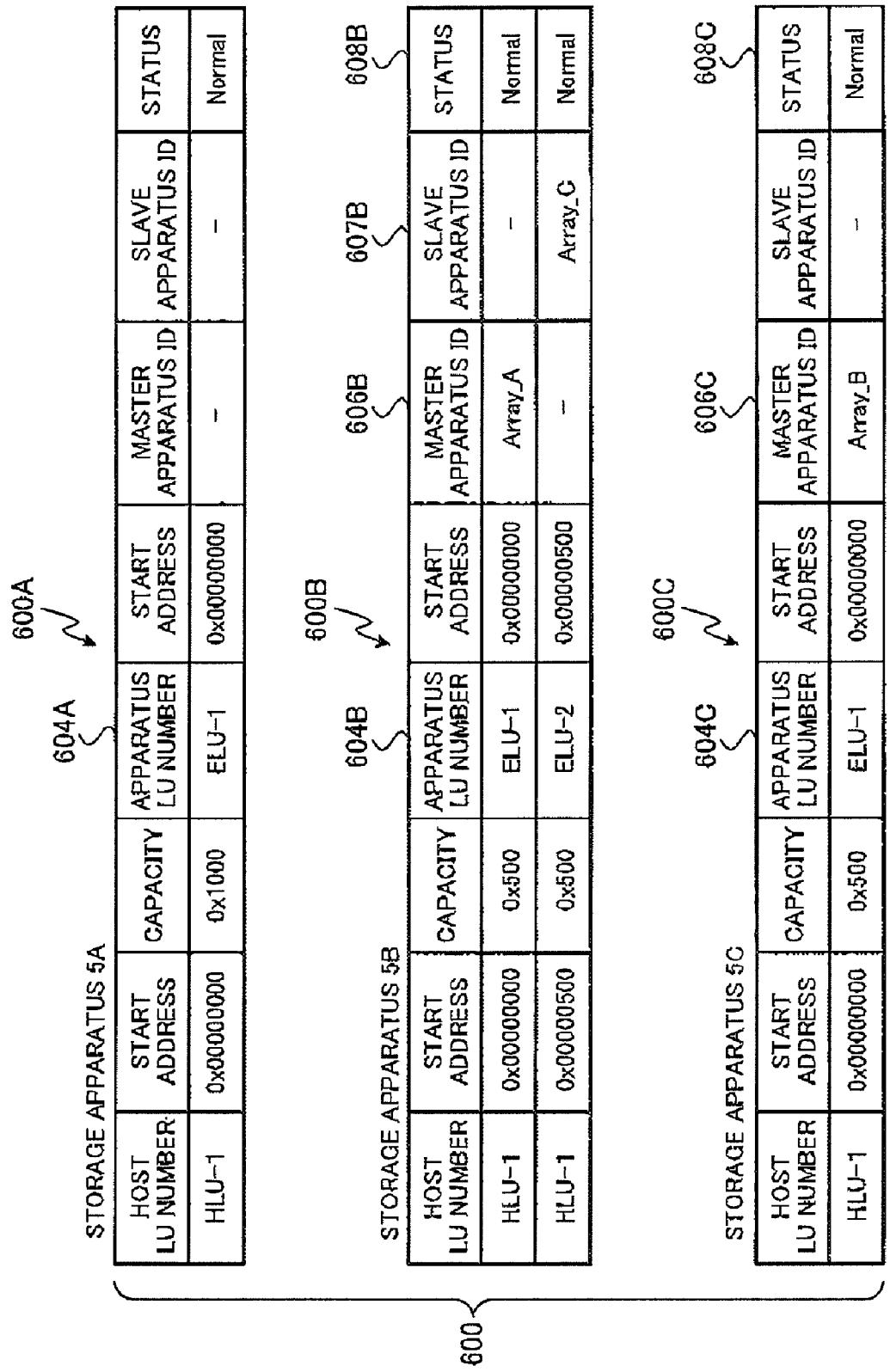
FIG. 20 is a diagram showing an example of the logical unit management table in the storage apparatus according to an embodiment of the present invention.

The storage apparatuses 5B and 5C set the external storage configuration after writing the data (STEP 1604), and send a completion command to the storage apparatus 5A (STEP 1605). FIG. 20 shows the logical unit management tables 600A through 600C of the storage apparatuses 5A to 5C in the foregoing case. In other words, the storage apparatus 5B sets the storage apparatus 5C as the external storage apparatus (slave apparatus), and the storage apparatus 5C sets the storage apparatus 5B as the master apparatus. The storage apparatus 5A changes its own internal logical unit ILU into an external logical unit ELU.

Figure 17C:
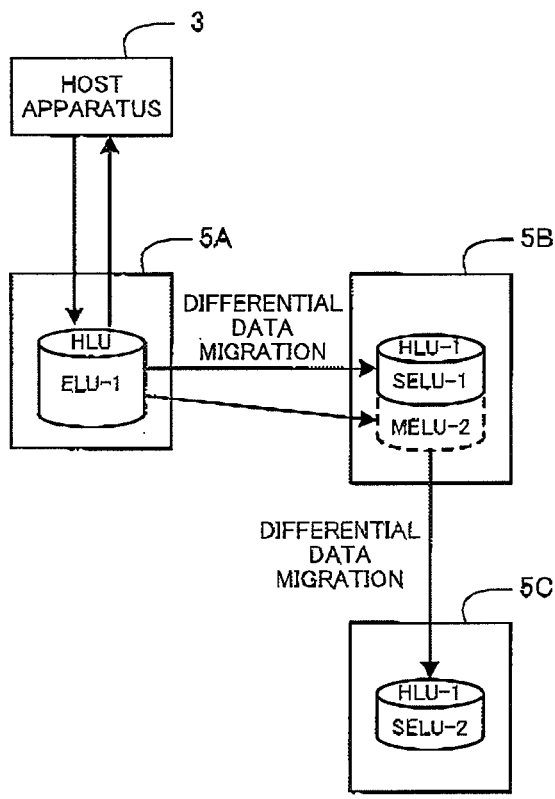
Figure 17D:
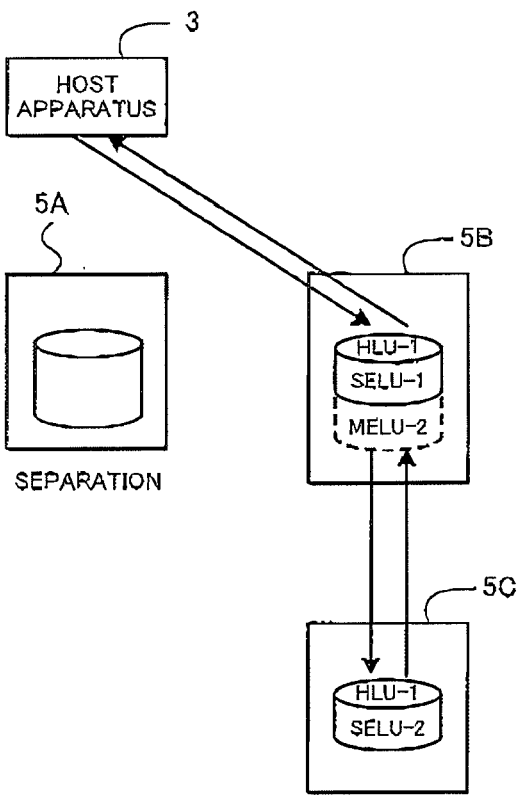
Figure 18:
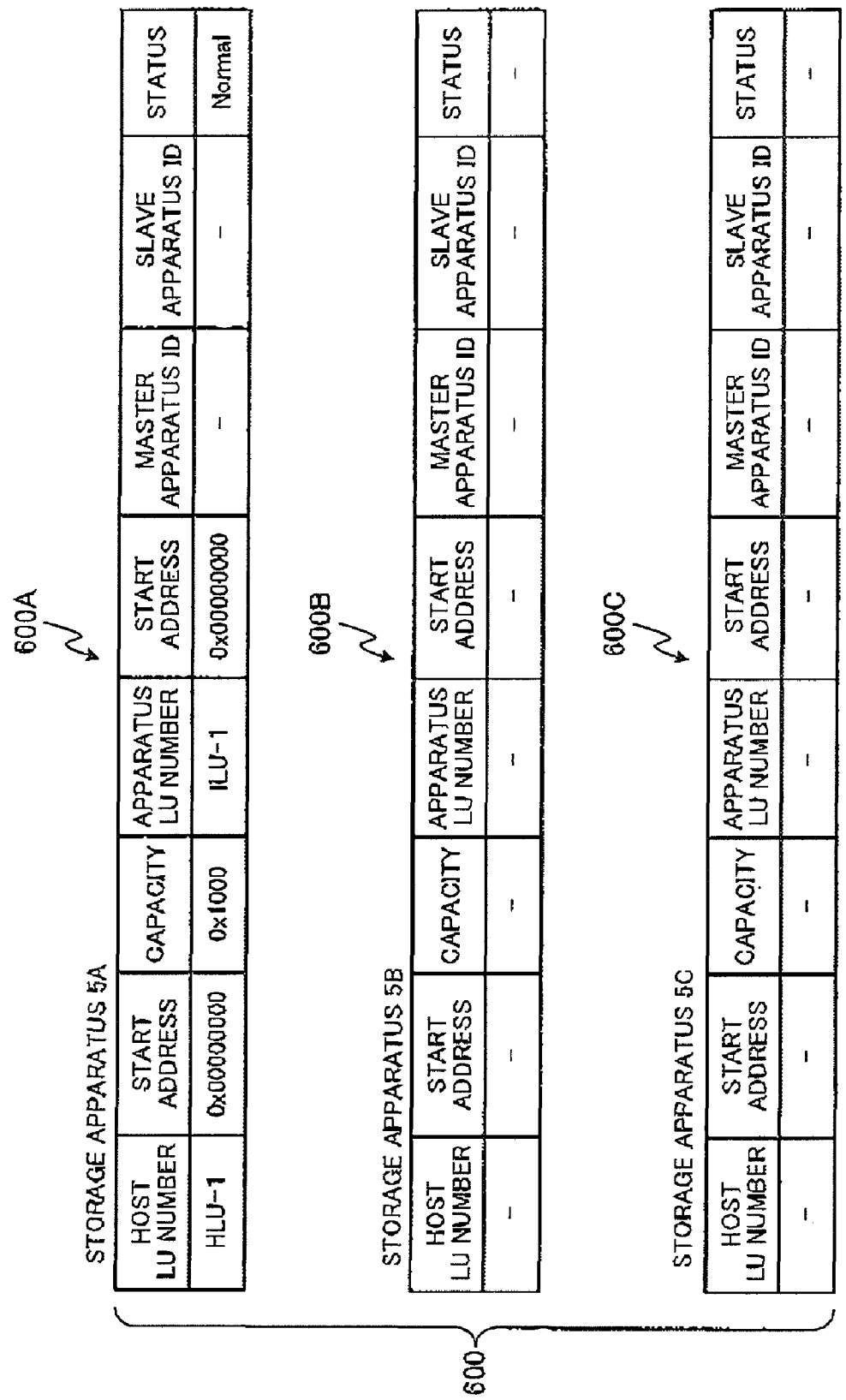
FIG. 18 is a diagram showing an example of the logical unit management table in the storage apparatus according to an embodiment of the present invention.

The storage apparatus 5A thereafter sends the data written into the logical unit LU after the start of data migration up to now, as differential data, to the storage apparatus 5 as the portal apparatus B (STEP 1606). The storage apparatus 5B, as shown in FIG. 17C, writes the received differential data into its own logical unit LU (i.e., slave external logical unit SELU) if it is addressed thereto, and transfers such differential data to the storage apparatus 5C if it is addressed to the logical unit LU (i.e., master external logical unit MELU) of the storage apparatus 5C (STEP 1607).

Figure 21:
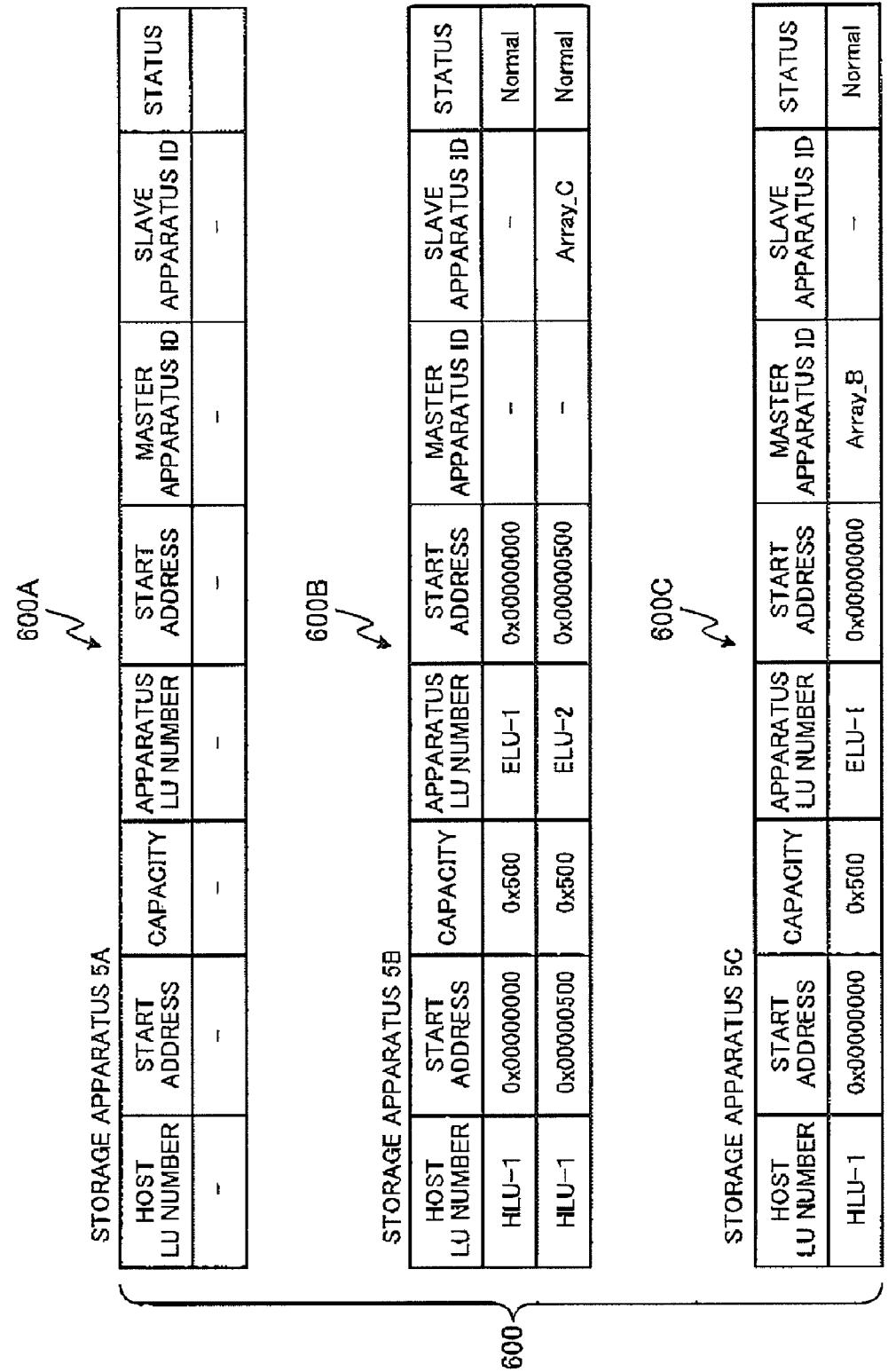
FIG. 21 is a diagram showing an example of the logical unit management table in the storage apparatus according to an embodiment of the present invention.

When the migration of the differential data is complete, the storage apparatus 5A sends a path switch request to the host apparatus 3 (STEP 1608). Further, the storage apparatus 5B, as shown in FIG. 21, changes its own slave external logical unit SELU to an internal logical unit ILU (STEP 1610). The host apparatus 3 receives the path switch request, and switches the path so that the storage apparatus 5B becomes the target (STEP 1609). The host apparatus 3 then issues an I/O request to the storage apparatus 5B. As a result, the host apparatus 3 can recognize via the storage apparatus 5B the logical unit LU that was taken over. Thus, if the I/O request from the host apparatus 3 is addressed to the external logical unit ELU, the storage apparatus 5B transfers the I/O request to the storage apparatus 5C via the external connection port, and transfers the I/O reply sent from the storage apparatus 5C to the host apparatus 3 (STEP 1611).

A specific example of the logical unit takeover processing in a case where a separate storage apparatus 5 is added after one storage apparatus 5 is removed from the storage system 4 of this embodiment is now explained with reference to FIG. 22 through FIG. 26.

Figure 22:
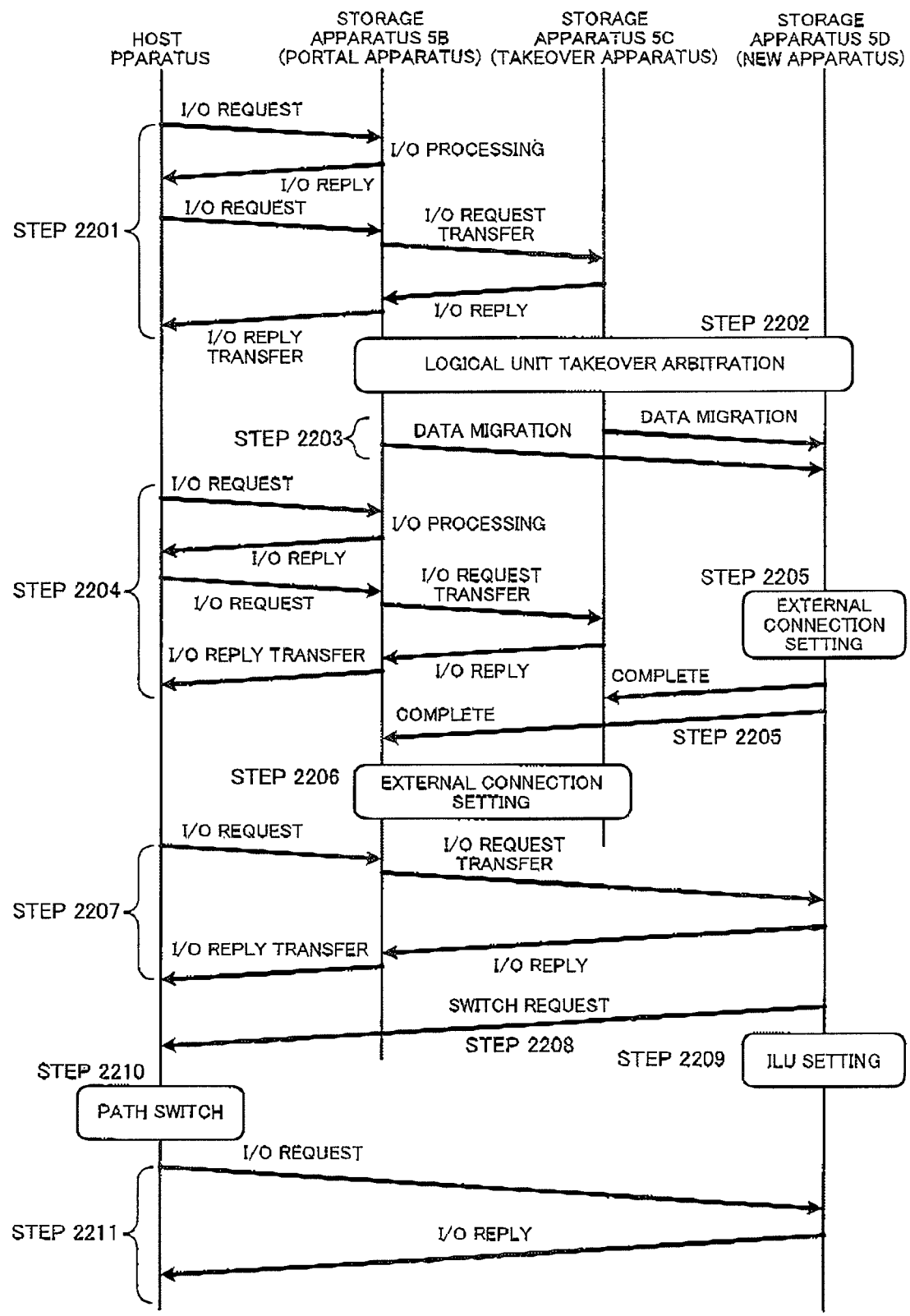
FIG. 22 is a sequence chart explaining the logical unit takeover processing in a case where a separate storage apparatus is added after one storage apparatus 5 is removed from the storage system according to an embodiment of the present invention.

FIG. 22 is a sequence chart explaining the logical unit takeover processing in a case where a separate storage apparatus 5 is added after one storage apparatus 5 is removed from the storage system 4 according to an embodiment of the present invention.

Figure 23A:
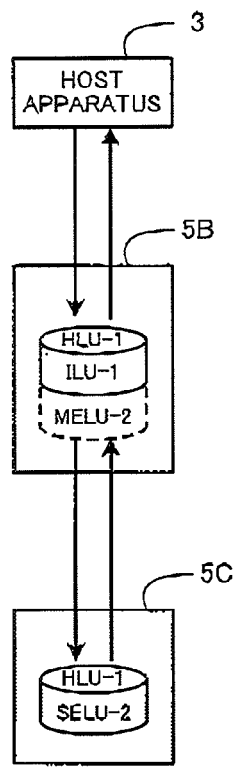
FIG. 23A to FIG. 23D is a diagram showing the relationship among the logical units of the storage apparatuses according to an embodiment of the present invention.
Figure 24:
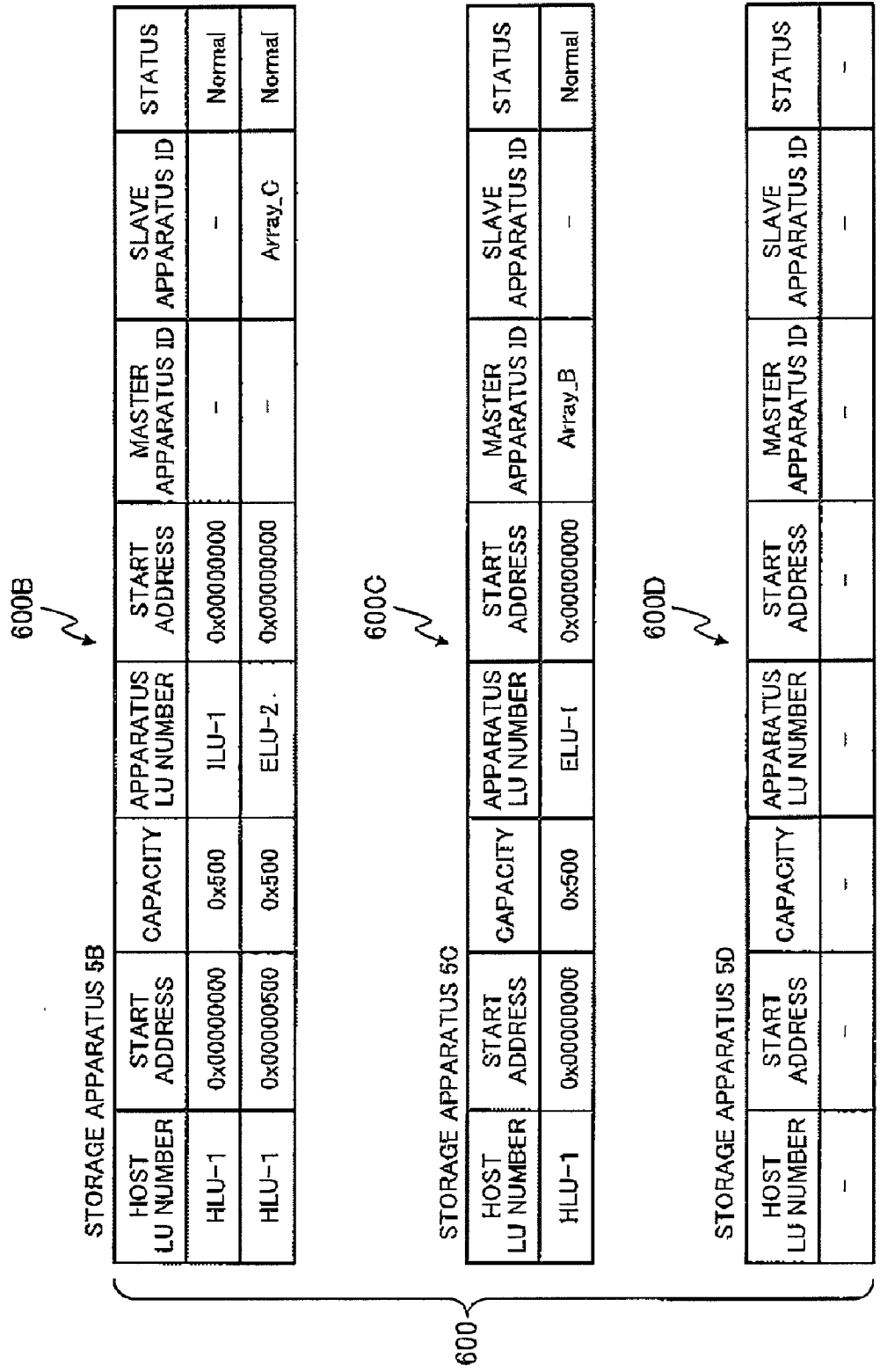
FIG. 24 is a diagram showing an example of the logical unit management table in the storage apparatus according to an embodiment of the present invention.

As described above, the storage apparatuses 5B and 5C take over the logical unit LU of the storage apparatus 5A, and the storage apparatus 5B as the portal apparatus causes the host apparatus 3 to recognize the logical unit LU that was taken over. Specifically, the storage apparatus 5C serves as the external storage apparatus (slave apparatus) of the storage apparatus 5B, and the storage apparatus 5B makes it appear to the host apparatus 3 that the logical unit LU taken over by the storage apparatus 5C and the logical unit LU that it took over are the logical units LU that were provided by the storage apparatus 5A. Thus, the host apparatus 3 I/O accesses the logical unit LU taken over from the storage apparatus 5A via the storage apparatus 5B as the portal apparatus (STEP 2201). FIG. 23A shows the relationship of the host apparatus 3 and the storage apparatuses 5B and 5C in the foregoing case. As apparent from FIG. 23A, the storage apparatus 5C is functioning as the external storage apparatus (slave apparatus) of the storage apparatus 5B. FIG. 24 shows the logical unit management tables 600A through 600C of the respective storage apparatuses 5A-5C in this case.

Figure 25:
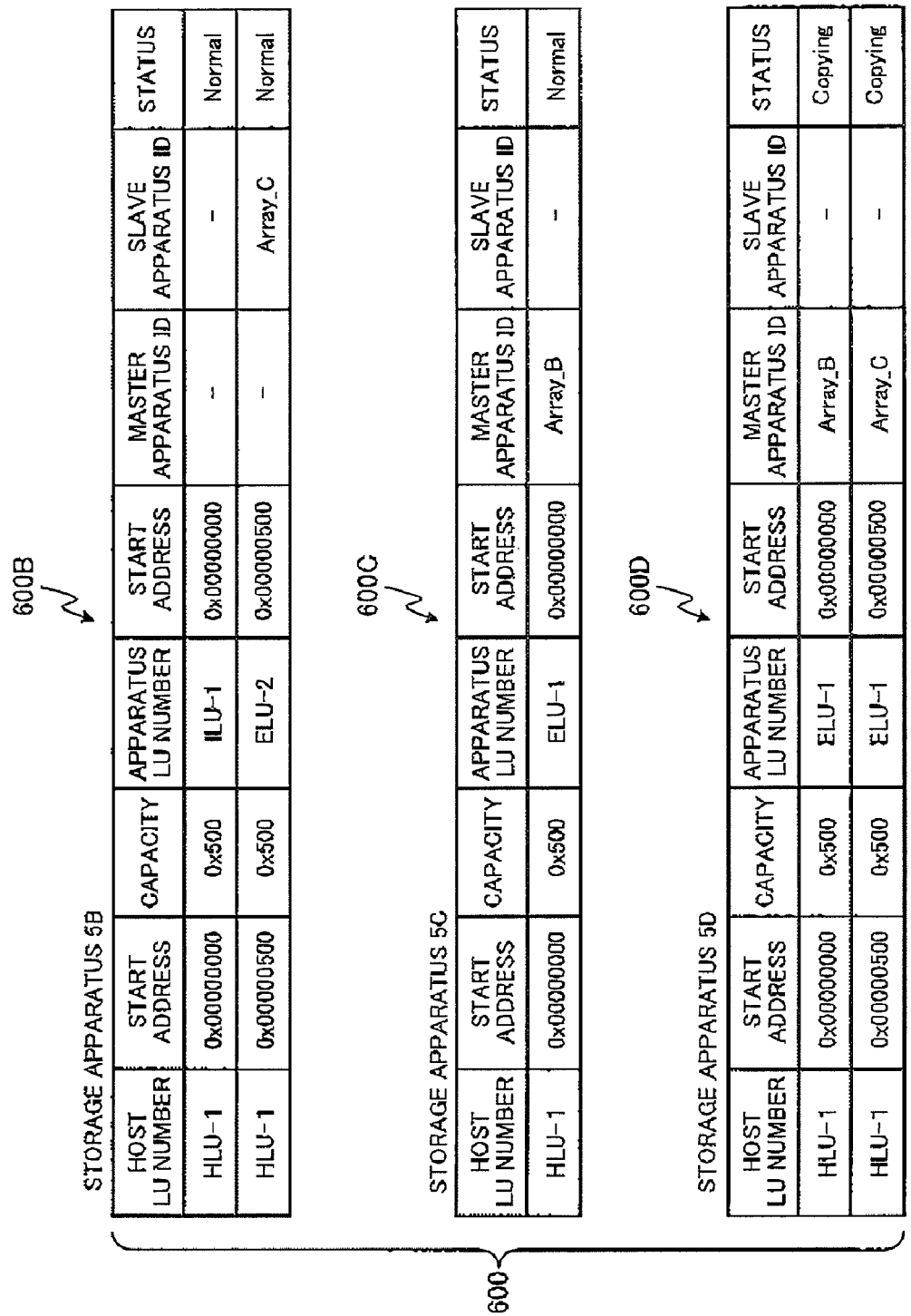
FIG. 25 is a diagram showing an example of the logical unit management table in the storage apparatus according to an embodiment of the present invention.

Under this circumstance, it may be assumed that a storage apparatus 5D is added to the storage system 4. The newly added storage apparatus 5D requests the takeover arbitration (consolidated arbitration) of the logical units according to an initial sequence (STEP 2202). In this example, it may be assumed that the logical unit LU of the storage apparatus 5B and the logical unit LU of the storage apparatus 5C are consolidated in the storage apparatus 5D. Thus, the storage apparatus 5D updates the logical unit management table 600D as shown in FIG. 25. Specifically, the storage apparatus 5D creates a slave external logical unit SELU with the storage apparatuses 5B and 5C as the master apparatuses.

Figure 23B:
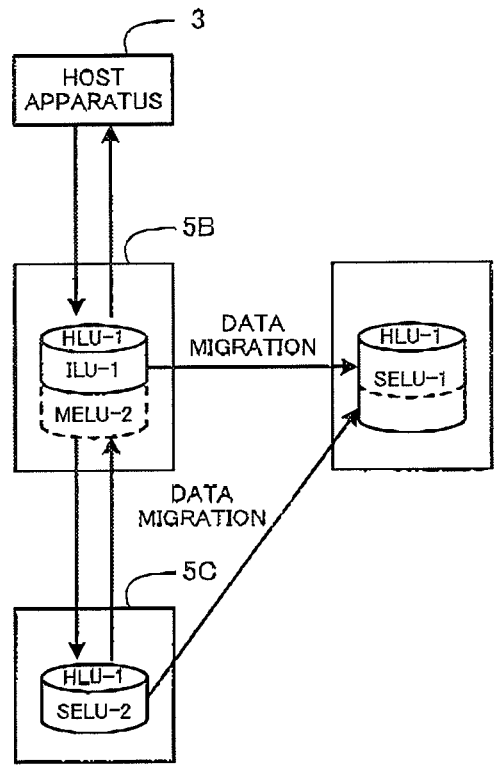

If the consolidated arbitration is successful, the storage apparatus 5B sends the data in the logical volume LU to the storage apparatus 5D, and the storage apparatus 5D writes the sent data into the created slave external logical volume SELU. Likewise, the storage apparatus 5C sends the data in the logical volume LU to the storage apparatus 5D, and the storage apparatus 5D writes the sent data in the created slave external logical volume SELU (STEP 2203). Since the storage apparatus 5C is the external storage apparatus (slave apparatus) of the storage apparatus 5B as described above, the storage apparatus 5B may also once read the data of the master external logical unit MELU from the corresponding slave external logical unit SELU of the storage apparatus 5B, and then transfer such data to the storage apparatus 5D. As described above, the logical volumes of the storage apparatus 5A are accessed based on the I/O request from the host apparatus 3 even during the data migration (STEP 2204). FIG. 23B shows the relationship among the logical volumes LU during the data migration.

Figure 23C:
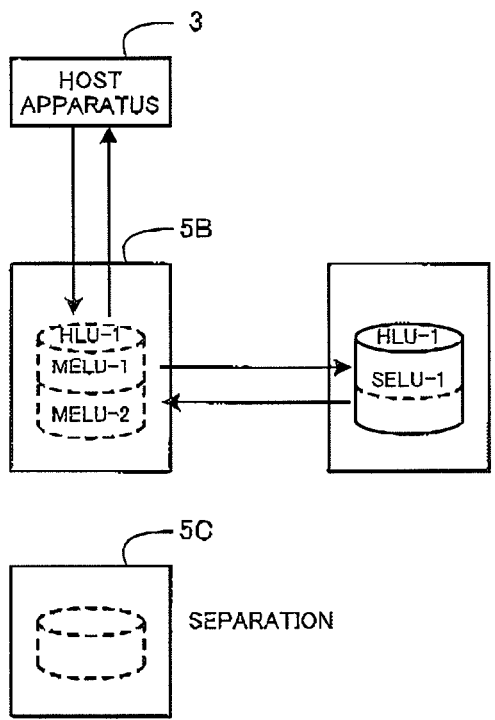

The storage apparatus 5D sets the external storage configuration after the writing of data is complete (STEP 2205), and sends a completion command to the storage apparatus 5A (STEP 2206). The storage apparatuses 5B and 5C receives the completion command and then change the external storage configuration. FIG. 26 shows the logical unit management tables 600A to 600C of the storage apparatuses 5A to 5C in the foregoing case. Specifically, the storage apparatus 5B sets the storage apparatus 5D as the external storage apparatus (slave apparatus), and separates the storage apparatus 5C. FIG. 23C shows the relationship among the logical units LU in this case. The storage apparatus 5D sets the storage apparatus 5B as the master apparatus. The I/O request from the host apparatus 3 to the storage apparatus 5B is thereby transferred to the storage apparatus 5D.

Figure 23D:
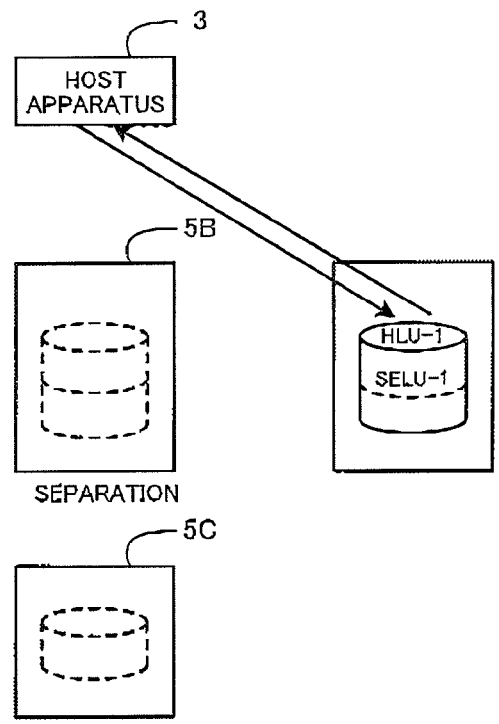

The storage apparatus 5D then sends a path switch request to the host apparatus 3 (STEP 2208), and changes its own slave external logical unit SELU to an internal logical unit ILU (STEP 2209). The host apparatus 3 receives the path switch request, and switches the path so that the storage apparatus 5B becomes the target (STEP 2210). The host apparatus 3 thereafter issues an I/O request to the storage apparatus 5D (STEP 2211). FIG. 23D shows the relationship among the logical units LU in this case. Further, the storage apparatus 5B, as shown in FIG. 27, changes its own slave external logical unit SELU to an internal logical unit ILU (STEP 1610). In other words, the host apparatus 3 will recognize the logical unit LU that was taken over in the storage apparatus 5D.

An example of the logical unit takeover processing according to lifetime detection by the storage apparatus 5 in this embodiment is now explained.

FIG. 28 is a diagram showing an example of the replacement timing confirmation table 2800 in the storage apparatus 4 according to an embodiment of the present invention.

As shown in FIG. 28, the replacement timing confirmation table 2800 includes an apparatus ID 2801, number of apparatus warranty years 2802, an operation start date 2803, total number of operation days 2804, and remaining lifetime days 2805.

The apparatus ID 2801 is an identifier for uniquely identifying the self-storage apparatus 5. The number of apparatus warranty years 2802 is the number of years that the proper operation of the storage apparatus 5 is guaranteed with ordinary use. For instance, this would be a value decided based on the tests results or the empirical rules of the manufacturer. The operation start date 2803 is the date that the storage apparatus 5 started operating. The total number of operation days 2804 is the total number of days that the storage apparatus 5 actually operated, and the number of days that the storage apparatus 5 was inactive due to maintenance or management is deducted from this value. The remaining lifetime days 2805 are the number of days obtained by subtracting the total number of operation days from the number of apparatus warranty years 2802.

Figure 29:
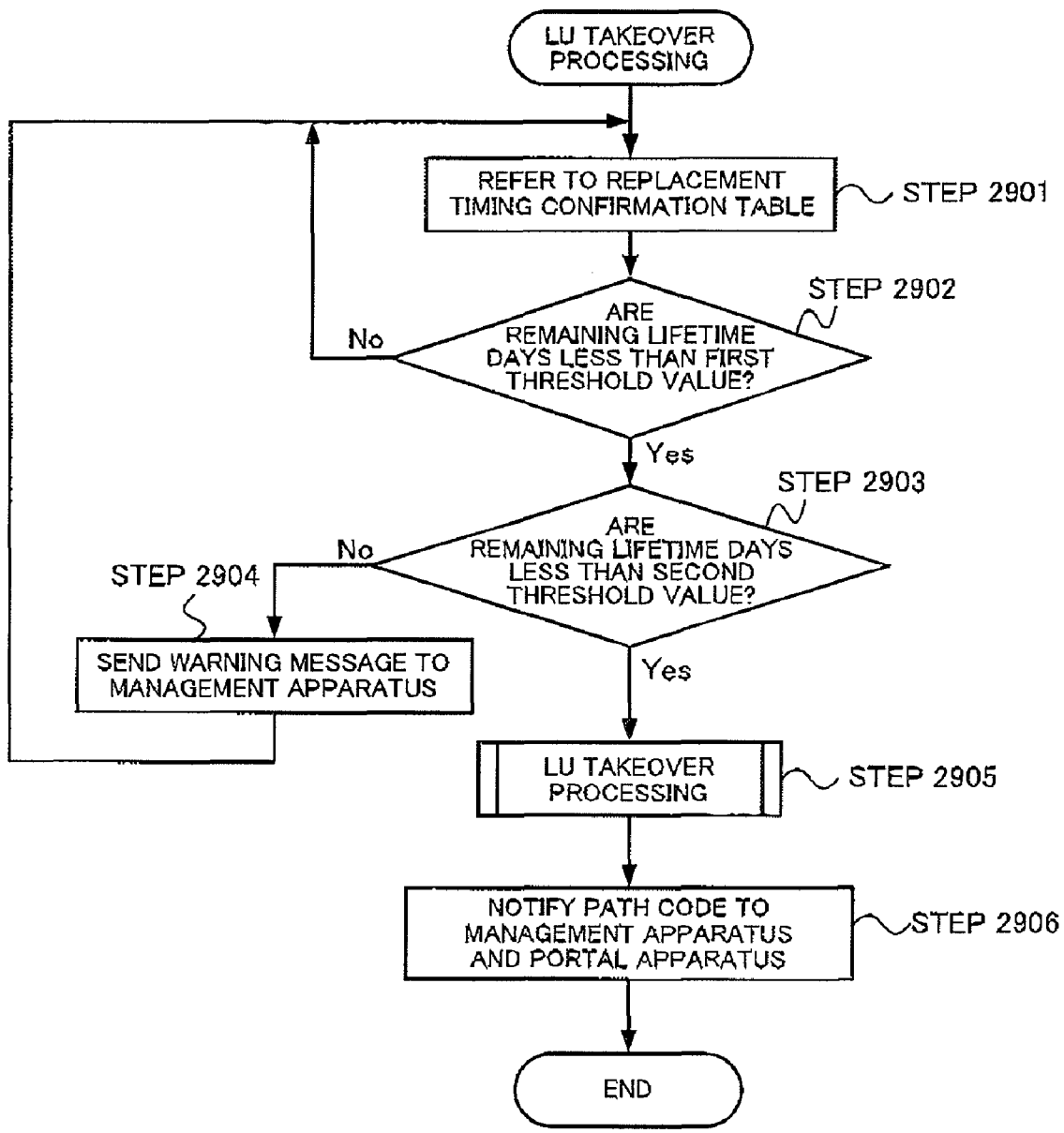
FIG. 29 is a flowchart explaining the logical unit takeover processing according to the lifetime detection in the storage apparatus according to an embodiment of the present invention.
Figure 30:
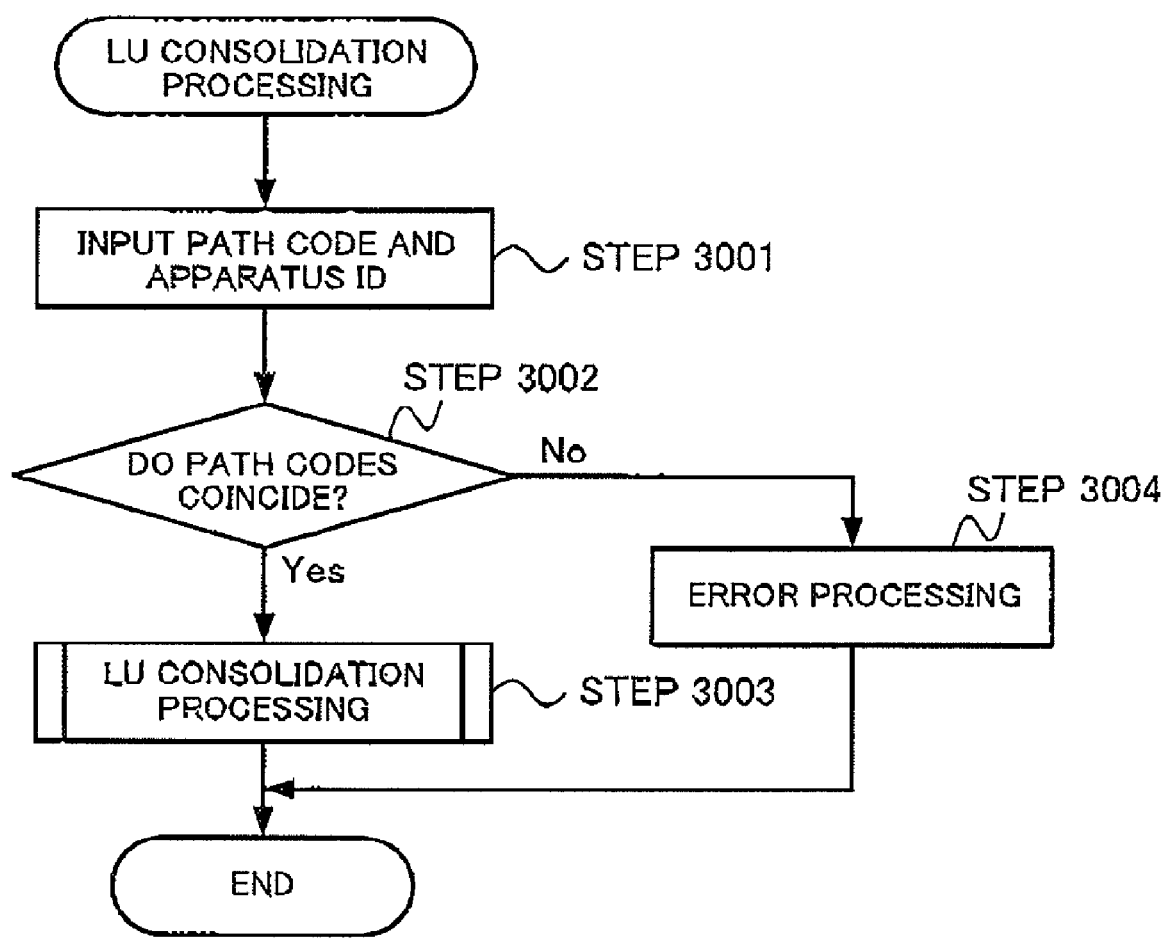
FIG. 30 is a flowchart explaining the logical unit takeover processing according to the lifetime detection in the storage apparatus according to an embodiment of the present invention.

FIG. 29 and FIG. 30 are flowcharts explaining the logical unit takeover processing according to lifetime detection in the storage apparatus 5 according to an embodiment of the present invention.

Specifically, as shown in FIG. 29 and FIG. 30, the storage apparatus 5 periodically calls the event monitoring program, refers to the replacement timing confirmation table 2800 (STEP 2901), and determines whether the remaining lifetime days 2805 are less than a first threshold value (STEP 2902). For example, the first threshold value is set to 60 days. If the storage apparatus 5 determines that the remaining lifetime days 2805 are not less than the first threshold value (STEP 2902; No), it returns to STEP 2901 and stands by for the next timing.

If the storage apparatus 5 determines that the remaining lifetime days 2805 are less than the first threshold value (STEP 2902; Yes), it thereafter determines whether the remaining lifetime days 2805 are less than a second threshold value (STEP 2903). For instance, the second threshold value is set to 30 days. If the storage apparatus 5 determines that the remaining lifetime days 2805 are not less than the second threshold value (STEP 2903; No), it sends a message to the management apparatus 6 indicating that the remaining lifetime days 2805 are few (STEP 2904). This message may be sent via email. This message may also indicate that the logical unit takeover processing will be executed at the point in time that the second threshold value is reached. The management apparatus 6 receives the message, and displays this message on the user interface. The system administrator is able to issue a command for suspending the takeover processing based on this message.

Contrarily, if the storage apparatus 5 determines that the remaining lifetime days 2805 are less than the second threshold value (STEP 2903; Yes), it performs the foregoing logical unit takeover processing (STEP 2905). Thereby, the storage apparatuses 5 in the storage system 4 take over the logical units via cooperative distributed operation. The storage apparatus 5 thereafter creates path code and sends it to the management apparatus 6 and the storage apparatus 5 as the portal apparatus (STEP 2906). The path code is used for authentication upon adding a new storage apparatus 5. The system administrator is thereby able to know the path code via the user interface of the management apparatus 6. The storage apparatus 5 as the portal apparatus additionally retains the received path code.

If the system administrator acquires a new storage apparatus 5, such system administrator performs necessary wiring work to add the such new storage apparatus 5 to the storage system 4, and then boots the new storage apparatus 5. The system administrator accesses the storage apparatus 5 as the portal apparatus using the user interface of the management apparatus 6, and inputs the path code described above and the apparatus ID of the new storage apparatus 5 (STEP 3001 of FIG. 30).

In response, the storage apparatus 5 as the portal apparatus determines whether the foregoing path code coincides with the retained path code (STEP 3002), and, if the storage apparatus 5 as the portal apparatus determines that the path codes do not coincide (STEP 3002; No), it performs prescribed error processing (STEP 3004), and then ends the processing.

Meanwhile, if the storage apparatus 5 as the portal apparatus determines that the path codes coincide (STEP 3002; Yes), it recognizes the storage apparatus 5 designated with the apparatus ID as the storage apparatus 5 of the consolidation destination, and performs the consolidation processing described above (STEP 3003). The takeover/consolidation processing of logical units in accordance with the apparatus life can be performed extremely smoothly.

Figure 31:
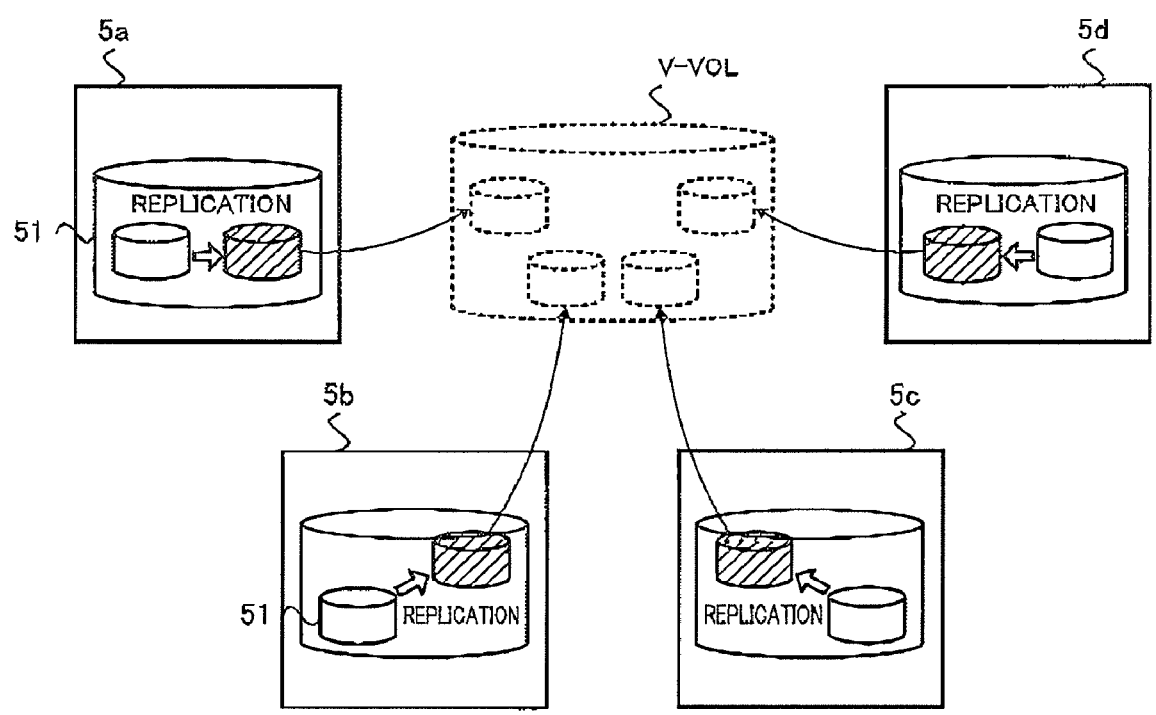
FIG. 31 is a conceptual diagram explaining a virtual storage configuration in the storage system according to an embodiment of the present invention.

An application example of the storage system 4 according to the present embodiment is now explained. FIG. 31 is a conceptual diagram explaining the virtual storage configuration of the storage system 4 according to an embodiment of the present invention.

Specifically, as shown in FIG. 31, a client computer (not shown) (can be associated with the host apparatus 3) recognizes a virtual volume V-VOL provided by one virtual storage apparatus. In other words, the virtual volume V-VOL is configured from the volumes VOL provided by the actual storage apparatuses 5a to 5d. One of the storage apparatuses 5 serves as the portal apparatus (master apparatus), and the other storage apparatuses 5 serves as the external storage apparatuses (slave apparatuses). Accordingly, the storage apparatus 5 as the portal apparatus receives an I/O request from the respective client computers and, as needed, access the other storage apparatuses as the external storage apparatuses, and sends an I/O reply to the client computers. Accordingly, the storage system allows the respective client computers to apparently recognize one virtual volume V-VOL via the storage apparatus 5 as the portal apparatus.

This kind of virtual storage processing can be used in a joint project such as software development by mutually independent organizations. In other words, when the project is launched, the client computers belonging to the respective organizations recognize the virtual volume V-VOL via the storage apparatus 5 as the portal apparatus and perform operations. After the dissolution of the project, the respective storage apparatuses 5 are separated and used in the respective organizations.

Figure 32:
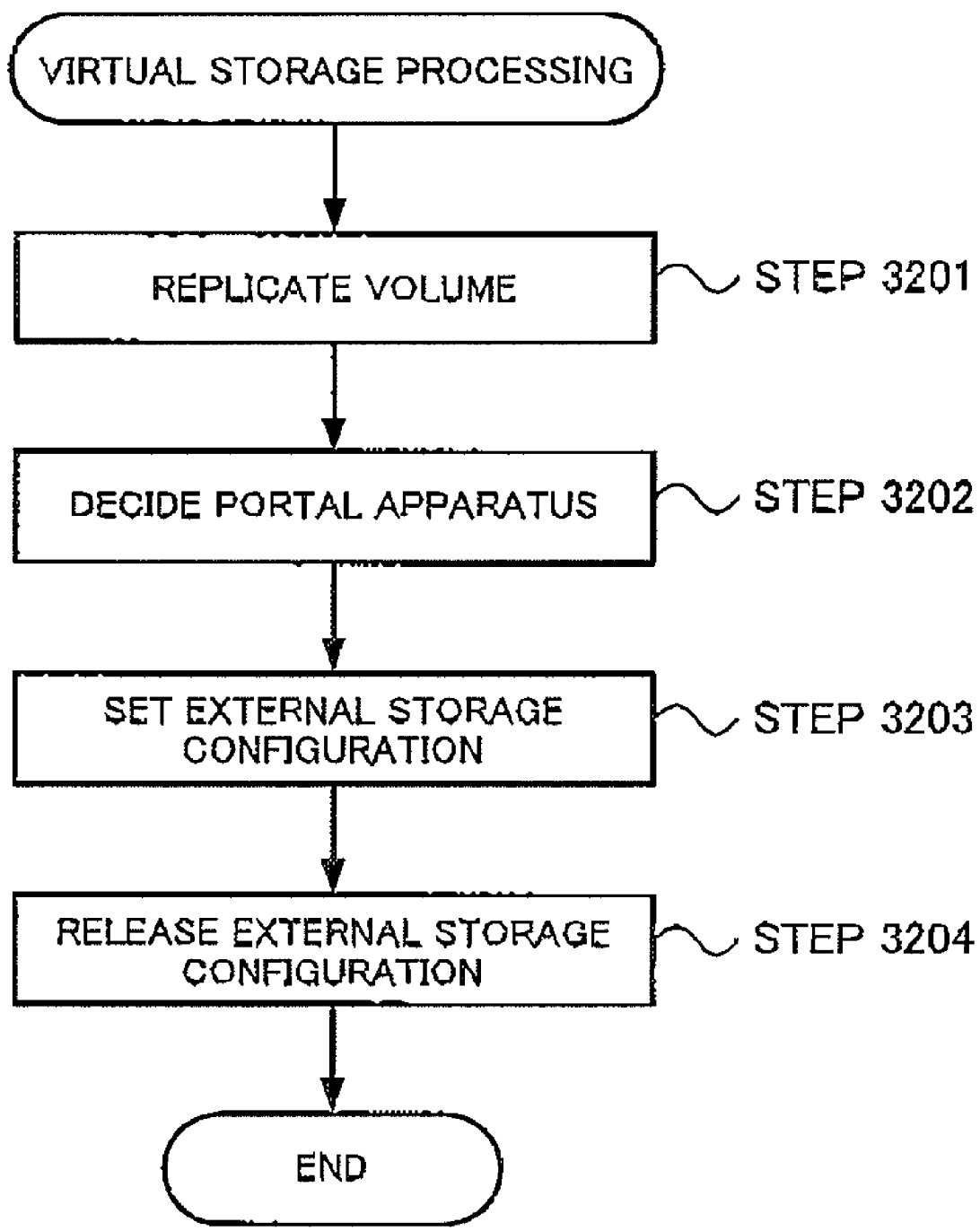
FIG. 32 is a flowchart explaining the virtual storage processing of the storage system according to an embodiment of the present invention.

FIG. 32 is a flowchart explaining the virtual storage processing of the storage system 4 according to an embodiment of the present invention.

Specifically, as shown in FIG. 32, each storage apparatus 5 creates a replication (replicated volume) of the logical volume according to a command from the system administrator operating the management apparatus 6 (STEP 3201). Subsequently, one of the storage apparatuses 5 is decided as the portal apparatus (STEP 3202). This decision may be made by the system administrator designating one storage apparatus 5 as the portal apparatus, or the respective storage apparatuses 5 may decide one storage apparatus 5 as the portal apparatus through intercommunication.

Each storage apparatus 5 thereafter creates an external storage configuration by associating the replicated volumes (STEP 3203). Specifically, the storage apparatus 5 as the portal apparatus sets the other storage apparatuses 5 as the external storage apparatuses. In this status, each client computer is able to access the replicated volume of the respective storage apparatuses 5 as though accessing the virtual volume V-VOL via the storage apparatus 5 as the portal apparatus.

When cancelling the virtual storage, each storage apparatus 5 cancels the external storage configuration and changes the replicated volume to its own internal volume (STEP 3204).

As described above, by applying the present invention to a virtual storage configuration, even without a physical storage apparatus 5, the existing storage apparatuses 5 can accommodate the storage areas and provide one virtual logical volume to a plurality of client computers.

The embodiments described above are for exemplifications for explaining the present invention, and are not intended to limit the present invention to such embodiments. The present invention can be implemented in various modes so as long as the implementation does not deviate from the gist hereof. For instance, although the embodiments sequentially explained the processing of the various programs, the present invention is not limited thereto. Thus, the extent that there is not discrepancy in the processing result, the processing sequence may be switched or performed in parallel.

The present invention can be broadly applied to storage systems configured from a plurality of storage apparatuses.

What is claimed is:

1. A storage apparatus comprising:
a drive unit in which at least one logical unit is formed; and
a controller unit configured to access the at least one logical unit by controlling the drive unit in accordance with an access request sent from a host apparatus,
wherein the controller unit comprises:
a takeover request unit configured to issue a takeover request of the at least one logical unit to a plurality of other storage apparatuses;
an external storage configuration unit configured to allocate to the at least one logical unit a logical unit formed in each of the plurality of other storage apparatuses that will accept the takeover of the at least one logical unit according to a takeover approval sent each from the plurality of other storage apparatuses in response to the takeover request sent from the takeover request unit;
a data migration unit configured to migrate data in the at least one logical unit to a logical unit formed in each of the plurality of other storage apparatuses allocated with the external storage configuration unit; and
a path switch request unit configured to issue a path switch request such that an access request sent from the host apparatus is given to at least one of the plurality of other storage apparatuses after the migration of the data by the data migration unit is complete.

2. A storage system comprising a plurality of storage apparatuses interconnected with each other via a network;
wherein each of the plurality of storage apparatuses comprises:
a drive unit in which at least one logical unit is formed; and
a controller unit configured to access the at least one logical unit by controlling the drive unit in accordance with an access request sent from a host apparatus,
wherein the controller unit in each of the plurality of storage apparatuses comprises:
a takeover request unit configured to send out a takeover request of a logical unit under the control of the controller unit to the network;
a takeover approval unit configured to determine whether to approve the takeover of a logical unit under the control of the controller unit in response to a takeover request of a logical unit received from the network;
a logical unit creation unit configured to create a particular logical unit when the takeover approval unit determines to approve the takeover;
an external storage configuration unit configured to allocate a particular logical unit formed in one of the other storage apparatuses to the logical unit under the control of the control unit;
a data migration unit configured to migrate data in the logical unit under the control of the control unit to the particular logical unit allocated by the external storage configuration unit; and
a path switch request unit configured to issue a path switch request such that an access request sent from the host apparatus is given to one of the other storage apparatuses after the migration of the data by the data migration unit is complete.

3. The storage system according to claim 2,
wherein the controller unit in each of the plurality of storage apparatuses further comprises a priority list table defining the takeover priority of the logical unit formed in each of the other storage apparatuses, and
wherein the takeover request unit creates the takeover request to the other storage apparatuses according to the priority list table.

4. The storage system according to claim 2,
wherein a controller unit in a first storage apparatus sends a takeover request of a first logical unit to the storage apparatuses other than the first storage apparatus;
wherein a controller unit in a second storage apparatus receives the takeover request sent from the first storage apparatus, determines whether to approve the takeover of the first logical unit designated in the takeover request, and creates a second logical unit if a takeover approval unit of the controller unit in the second storage apparatus determines to approval the takeover;
wherein the controller unit in the first storage apparatus allocates the first logical unit to the second logical unit, migrates data in the first logical unit to the second logical unit, and issues a path switch request such that the access request sent from the host apparatus is given to the second storage apparatus; and
wherein the controller unit in the second storage apparatus receives the access request sent from the host apparatus and accesses the second logical unit.

5. The storage system according to claim 4, wherein the controller unit in the second storage apparatus that received the takeover request determines whether to accept a role of a portal apparatus if the second storage apparatus is designated as the portal apparatus in the takeover request.

6. The storage system according to claim 5, wherein the controller unit in the second storage apparatus allocates to the second logical unit a third logical unit created in a third storage apparatus that received the takeover request.

7. The storage system according to claim 4, wherein the controller unit in the first storage apparatus sends the takeover request to the other storage apparatuses when a particular event occurs.

8. A method of taking over a logical unit in a storage system including a plurality of storage apparatuses interconnected with each other via a network, comprising:
sending, under control of a first storage apparatus that receives an access request from a host apparatus, a takeover request of a first logical unit to other storage apparatuses;
determining, under control of each of the other storage apparatuses that receives the takeover request, whether to approve the takeover of the first logical unit;
creating, under control of a second storage apparatus among the other storage apparatuses that determined to approve the takeover of the logical unit, a second logical unit for taking over the first logical unit;
allocating, under control of the first storage apparatus, the first logical unit to the second logical unit;
sending, under control of the first storage apparatus the data to the second storage apparatus in order to migrate data in the first logical unit to the second logical unit;
receiving, under control of the second storage apparatus, the data sent from the first storage apparatus and writing the data in the second logical unit; and
issuing, under control of the first storage apparatus, a path switch request such that an access request sent from the host apparatus is given to the second storage apparatus after the sending of the data is complete.

9. The takeover method of a logical unit according to claim 8, further comprising creating, under control of the first storage apparatus the takeover request according to a priority list table defining the takeover priority of a logical unit formed in each of the other storage apparatuses.

10. The takeover method of a logical unit according to claim 9, further comprising specifying, under control of the first storage apparatus, one of the other storage apparatuses to be a portal apparatus according to the priority list table.

11. The takeover method of a logical unit according to claim 10, wherein the determining whether to approve the takeover of the first logical unit further includes determining whether to accept a role as a portal apparatus if the storage apparatus is designated as the portal apparatus in the received takeover request.

* * * * *